United States Patent [19]
Yagi et al.

[11] Patent Number: 5,367,420
[45] Date of Patent: Nov. 22, 1994

[54] MAGNETIC DISK DRIVE

[75] Inventors: Norio Yagi, Kawasaki; Yoshihiro Arikawa, Higashine; Ryuzi Satou, Kawasaki, all of Japan

[73] Assignee: Fujitsu Limited, Japan

[21] Appl. No.: 896,711

[22] Filed: Jun. 10, 1992

[30] Foreign Application Priority Data

Jun. 10, 1991 [JP] Japan ................................. 3-137883
Jun. 13, 1991 [JP] Japan ................................. 3-141829

[51] Int. Cl.$^5$ .......................................... G11B 21/24
[52] U.S. Cl. ...................................... 360/109; 360/104
[58] Field of Search ............... 360/104, 109, 103, 110, 360/137

[56] References Cited

U.S. PATENT DOCUMENTS

| | | |
|---|---|---|
| 4,366,563 | 12/1982 | Riddle . |
| 4,912,583 | 3/1990 | Hinlein .................... 360/104 |
| 4,991,045 | 2/1991 | Oberg ...................... 360/104 |
| 4,992,898 | 2/1991 | Wanlass .................... 360/104 |
| 5,003,420 | 3/1991 | Hinlein .................... 360/104 |
| 5,025,335 | 6/1991 | Stefansky . |
| 5,041,932 | 8/1991 | Hamilton . |

FOREIGN PATENT DOCUMENTS

| | | |
|---|---|---|
| 0093886 | 11/1983 | European Pat. Off. . |
| 0324966 | 7/1989 | European Pat. Off. . |
| 58-218023 | 12/1983 | Japan . |
| 60-136978 | 6/1985 | Japan . |
| 60-187911 | 9/1985 | Japan . |
| 62-219277 | 9/1987 | Japan . |
| 1213821 | 8/1989 | Japan . |
| 3178017 | 8/1991 | Japan . |
| 3212867 | 9/1991 | Japan . |
| 2221786 | 2/1990 | United Kingdom . |
| 9001205 | 2/1990 | WIPO . |

*Primary Examiner*—Louis J. Casaregola
*Attorney, Agent, or Firm*—Greer, Burns & Crain, Ltd.

[57] ABSTRACT

A magnetic disk drive comprises a plurality of disks that have a laminated arrangement with equally fixed spaces respectively, and are rotatably mounted, a disk driving unit that forces the disks to rotate, a plurality of positioners that are mounted movably in the normal direction to the tracks of the disks, respectively, a positioner driving unit that drives the positioners so that their respective ends can traverse the tracks, and a plurality of reproducing/recording elements e.g. unitary magnetic heads that are fixed on the respective ends of the positioners and perform read/write operations for the surfaces of recording media of the disks respectively. Each of the reproducing/recording elements is constructed such that each of the elements is adjustable in the rolling direction with respect to the respectively corresponding surface of recording media of the disks and adjustable in the distance from the respectively corresponding surface of recording media of the disks. Preferably, the method for assembling the disk drive includes the steps of locating the arras in a desired position, driving the sliding portions, detecting at least the degree of angle and relative distance between each one tip portion of the unitary magnetic heads and the respectively corresponding surfaces of recording media of the disks, and fixing the sliding portions and the guide portions to each other.

13 Claims, 33 Drawing Sheets

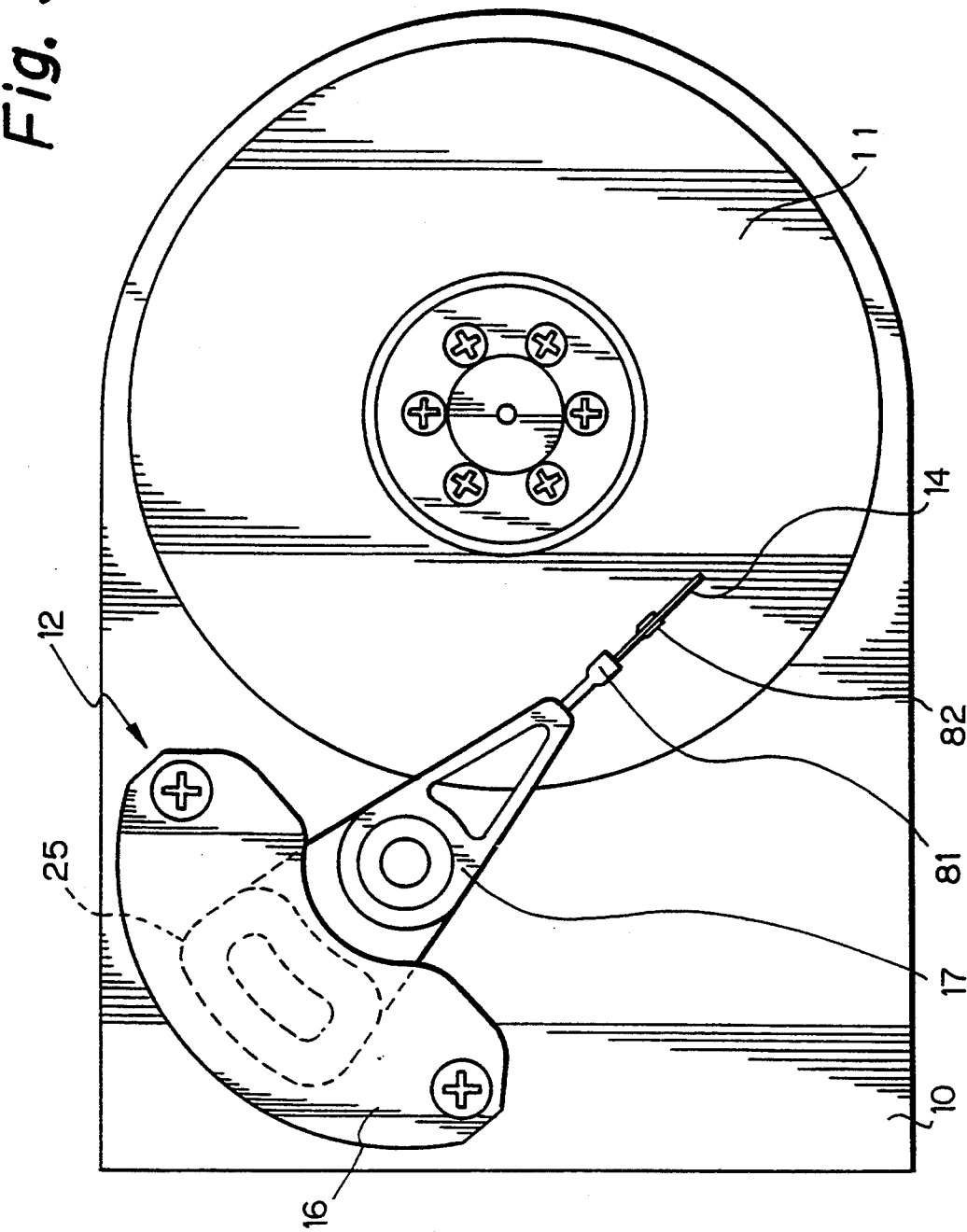

MAGNETIC DISK DRIVE

BACKGROUND OF THE INVENTION

1. Field of Invention

The present invention relates to a magnetic disk drive that can be utilized as an external memory of a computer and a device for assembling the above magnetic disk drive. More specifically, it relates to an electromagnetic read/write structure of a magnetic disk drive within a disk enclosure including at least one magnetic disk and a corresponding magnetic head that ensures stable reproducing or recording operations with smaller dimensions. Further, it relates to a method for arranging the above magnetic head of the disk drive in a desired position.

2. Description of the Related Art

Generally, a magnetic disk drive, having a number of magnetic disks utilized as recording media, has been in practical use in various regions including computer networks as one of the promising non-volatile memory devices. Furthermore, in recent years, the fabrication of a magnetic disk drive that satisfies a demand for compatibility, has smaller dimensions, a lower cost, a larger amount of storage capacity, lighter weight and lower power consumption, has been required.

To meet the above requirement, it is necessary for as many magnetic disks as possible to be assembled in a confined space of a small area, instead of increasing the surface density of recording media of magnetic disks by improving the characteristics of a magnetic head, magnetic medium per se, etc., so that mass storage can be attained without an increase in the cost for the development of an excellent magnetic head. Alternatively, when the same sheet of disks as usual are assembled in the space, it is necessary for the thickness of the disk drive to be reduced as small as possible to promote compatibility. When the magnetic disk drive is applied to a mobile-type computer, such as a portable lap-top personal computer, it also becomes necessary for the disk drive to withstand external impulse and external electromagnetic disturbance, as well as be lighter in weight and have lower power consumption.

In a know magnetic disk drive according to the prior art, typically, a number of disks are arranged rotatably at high speed in a laminated manner with equally divided spaces respectively. On the respective surfaces of the magnetic layers, functioning recording media are formed concentrically. Further, in the vicinity of these disks, positioners are mounted and movable in the normal direction of the tracks of the disks, respectively, and supporting members are attached to the above positioners, respectively. Further, on respective ends of the above supporting members, the reproducing/recording elements, e.g., magnetic heads are fixed in close proximity to the respective Surfaces of the disks, so that the former can perform read/write operations for the tracks of the disks.

To be more specific, each of the above supporting members have an arm that is fixed on each of the positioners. The base end portion of each suspension element is fastened to the tip portion of each arm with screws. The above suspension element is formed by bending an extremely thin stainless steel sheet. Further, on both sides of the suspension element, bent portions are formed respectively to ensure the stiffness of the above suspension element. Each magnetic head is attached to the tip portion of each suspension element, via a gimbal. Further, lead wares extending from the magnetic head are arranged on the suspension element.

In the construction of such a magnetic disk drive, in order to increase the maximum sheets of disks that can be assembled in a given place within a disk enclosure, it seems reasonable that the thickness of the arms of supporting members should be decreased so that the distance between the surfaces of adjoining disks becomes shorter. However, when the above distance is too short, the bent portions of adjoining suspension elements are likely to interface and come into contact with each other. Therefore, it is difficult for the distance between the surfaces of adjoining disks to be reduced below a fixed value.

Furthermore, since the thickness of each magnetic head or any portion of a supporting member other than the bent portion is also necessitated to some degree, it becomes more difficult for the distance between the surfaces of adjoining disks to be reduced to a value less than the limited value (for example, 3 mm). Consequently, when the thickness of disk drive is predetermined, a disadvantage occurs in that the sheets of disks cannot be increased much more than the limited value known in the prior art. On the contrary, when the number of sheets of disks assembled are predetermined, another disadvantage occurs in that the thickness of a disk drive cannot be reduced less than the limited value also known in the prior art.

Furthermore, the lead wires have to be laid along the axial direction in the approximate center of the suspension, so that they do not disturb read/write operations of the magnetic head. Consequently, another disadvantage occurs in that it takes too much time to handle the above lead wires.

SUMMARY OF THE INVENTION

Accordingly, an object of the present invention is to provide a disk drive having a supporting structure of a magnetic head that enables the distance between the surfaces of adjoining disks (the thickness of space between the disks) to be reduced as small as possible, to realize simultaneously, thinner dimensions, compatibility, higher storage density, large storage capacity, lower cost, higher performance and the like, and a method for assembling such a disk drive.

A further object of the present invention is to provide a disk drive that enables, for the lead wires extending from the magnetic head, to be arranged easier, which promotes thinner dimensions.

To attain the above objects, the disk drive according to the present invention comprises the following components: at least one disks that have a laminated arrangement with equally fixed spaces respectively and are mounted rotatably, a disk driving means that forces said disks to rotate, at least one positioners that are mounted movably in the direction of the tracks of the disks, respectively, a positioner driving means that drives the positioners so that their respective ends can traverse the tracks, and at least one reproducing-/recording elements that are fixed on the respective ends of the positioners and perform read/write operations for the surfaces of recording media of the disks, respectively. Further, each of the reproducing/recording elements is constructed such that each of the elements is adjustable in the rolling direction with respect to the respectively corresponding surface of recording media of the disks. Furthermore, each of the reproducing/recording elements is further constructed such that each of the elements is adjustable in the distance from the respectively corresponding surface of recording media of the disks.

Preferably, each of the above reproducing/recording elements is a unitary magnetic head consisting of a flexible thin sheet body, a head portion that is located on one tip portion of the body and has an air gap for reproducing or recording formed on one surface of the body, and a mounting portion that is formed on the opposite tip portion of the body. The above unitary magnetic head has a much lighter weight than the conventional magnetic head, such as a MIG (metal in gap) magnetic head, and therefore it becomes possible for a tip portion of the unitary magnetic head to constantly be in contact with the surface a recording medium of each disk.

Further preferably, the disk drive according to the present invention further comprises head supporting members each having a tip end portion where a head mounting portion, in which is fixed the opposite tip portion of the body of each of the unitary magnetic heads, is formed and has a base end portion where a sliding portion is formed. The above disk drive further comprises guide portions each of which is formed in one end of each of the positioners and with which the sliding portion is engaged rotatably in the rolling direction and is movable in the axial direction. In this case, each sliding portion is adapted to be attached to the corresponding guide portion.

Further preferably, each of said positioners includes a positioner body portion that constitutes a main part of each of the positioners, and includes a plurality of arms that are mounted in the positioners in a laminated manner, respectively and one tip portion of which extends toward the respectively corresponding surfaces of recording media of the disks. Alternatively, at least one arm portion functioning as the above arm is integrated with each of the positioners at a portion thereof.

In a preferred embodiment, either one of each sliding portion and each guide portion has the form of a circular cylinder and the other one thereof has the corresponding cylindrical surface that supports, rotatably, the outer peripheral surface of the above circular cylinder.

More concretely, the above circular cylinder is a cylinder having a hollow portion inside to enable lead wires extending from each of the unitary magnetic heads to pass through the hollow portion.

Alternatively, the above lead wires, or otherwise a flexible printed circuit board, is constructed so as to be wound around the outer surface of each of the head supporting members.

Further preferably, each of the head supporting members forms a tapered surface that has a given inclination to the respectively corresponding surface of recording media of the disks.

Further preferably, the disk drive according to the present invention includes head supporting members each having a tip end portion where a head mounting portion, in which is fixed the opposite tip portion of the body of each of the unitary magnetic heads, is formed and each has a base end portion where a first sliding portion is formed, middle supporting members each having a tip end portion where a first guide portion, with which the first sliding portion is rotatably engaged, is formed and each has a base end portion where a second sliding portion is formed, and second guide portions each of which is formed on one end of each of the positioners and with which the second sliding portion is rotatably engaged in the rolling direction and movable in the axial direction. Further, the first sliding portion and the first guide portion are adapted to be fixed to each other and simultaneously the second sliding portion and the second guide portion are adapted so as to be fixed to each other.

Further preferably, the method for assembling the disk drive according to the present invention includes the following steps: first, setting each arm to a fixing means that locates said arm in a desired position and forces a head portion of said unitary magnetic head to have contact with the recording medium; second, irradiating the light beam in the vicinity of the contact portion between said unitary magnetic head and the recording medium and receiving the reflecting light by a detecting means; third, detecting the degree the angle and relative distance between said unitary magnetic head and the medium and notifying a control means of the results by said detecting means; fourth, driving a positioning devices in accordance with said results and setting the sliding portion to the guide portion in a predetermined position by said control means; fifth, coating an adhesive of ultraviolet hardening resin onto the contact portion between the sliding portion and said guide portion; and, sixth, irradiating ultraviolet ray and performing the fixing of the contact portion.

In a further preferred embodiment, each of the head supporting members has a base end portion in which the mounting portion of each of the unitary magnetic heads is fabricated by molding to ensure the read/write operations of the unitary magnetic heads. Furthermore, the lead wires extending from each of the unitary magnetic heads are preferably fabricated by molding simultaneously with the above mounting portion.

In all of the above constructions, each of the head supporting members is adapted to be adjustable in the rolling direction with respect to the respectively corresponding surface of recording media of the disks and further adjustable in the distance from the respectively corresponding surface of recording media of the disks. Therefore, before each sliding portion and each guide portion are fixed to each other, it becomes possible for a parallel and relative distance between the one tip portions of the unitary magnetic heads and the respectively corresponding surfaces of recording media of the disks.

Further, in such constructions, suspension elements and spacers functioning as head supporting members are not necessary, which is different from the prior art, and one end of the unitary magnetic head is mounted directly in the head mounting portion of the head supporting member. Therefore, the distance between adjoining disks can be reduced.

BRIEF DESCRIPTION OF THE DRAWINGS

The above object and features of the present invention will be more apparent from the following description of the preferred embodiments with reference to the accompanying drawings, wherein:

FIGS. 34, 35, 36, 37, 38 and 39 are views showing an eighth preferred embodiment of a disk drive according to the present invention;

DESCRIPTION OF THE PREFERRED EMBODIMENTS

Before describing the embodiments of the present invention, the related art and the disadvantages therein will be described with reference to the related figures.

Figure 1:
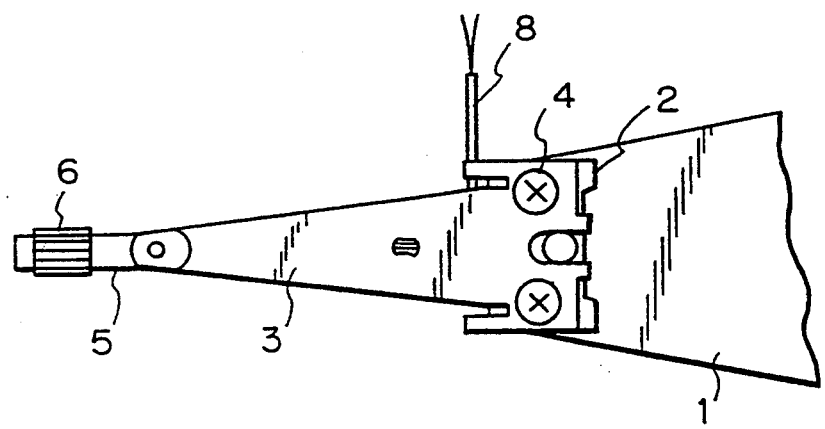
FIGS. 1, 2 and 3 are views showing a disk drive having a magnetic head supporting structure according to a prior art.
Figure 2:
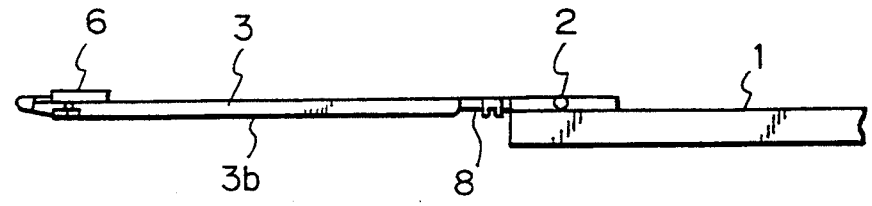
Figure 3:
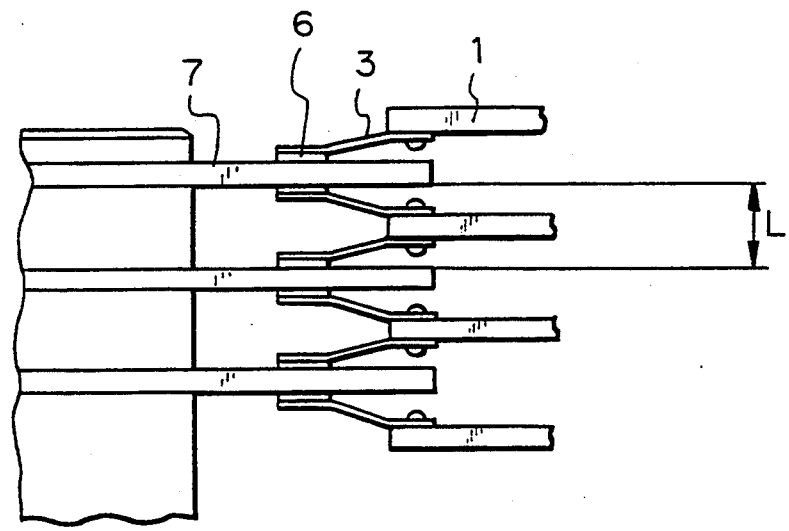

FIGS. 1, 2 and 3 are views showing a disk drive having a magnetic head supporting structure according to a prior art. To be more specific, FIG. 1 is a top view showing the magnetic head supporting structure and FIG. 2 is a front view showing the magnetic head supporting structure and FIG. 3 is a front view showing the main part of the magnetic disk drive including the magnetic head supporting structure. In this case, positioners that support arms are omitted to simplify the explanation.

In these figures, an arm 1, which is fixed on each of the positioners and driven by the above each positioner so that the arm 1 can traverse the track of the corresponding disk 7 is provided for each disk. Further, a base end portion of each suspension element 3 is fastened to the tip portion of each arm 1 via a spacer 2 with screws 4. In this case, the above suspension element is formed by bending an extremely thin stainless steel sheet, thereby forming the main part of the supporting member. Here, the spacer 2 is utilized as a reinforcing material for the suspension element 3. Further, on both sides of the suspension element 3, bent portions 3b are formed respectively to ensure the stiffness of the above suspension element. Further, each reproducing/recording element, e.g., magnetic head 6 is a attached to the tip end portion of each suspension element 3, via a gimbal 5 functioning as a part of the supporting members. Further, as shown, particularly in FIG. 3, a number of disks 7 are arranged rotatably at high speed in a laminated manner with equally divided spaces, respectively. Each magnetic head 6 is fixed in close proximity to the surface of the corresponding disk 7, so that the former can perform read/write operations of data for the track of each disk. 8 denotes lead wires for transmitting read/write signals from each magnetic head to electronic circuits. Further, these lead wires 8 are extending from each magnetic head 6 and are arranged on the corresponding suspension element 3.

In the construction of such a magnetic disk drive according to the above prior art, in order to increase the number of sheets of disks 7 that can be assembled in a given place within a disk enclosure (not shown in FIG. 1, 2 and 3), it seems reasonable that the thickness of the arms 1 should be decreased so that the distance between the surfaces of adjoining disks 7 become shorter. However, when the above distance is too short, the bent portions 3b of adjoining suspension elements 3 are likely to interface and come into contact with each other. Therefore, it is difficult for the distance between the surfaces of adjoining disks to be reduced below a fixed value. Furthermore, since the thickness of each magnetic head 6 and spacer 2, etc., are also necessitated to some degree, it becomes more difficult for the distance between the surfaces of adjoining disks to be reduced to a value less than the limited value (for example, 3 mm). Consequently, when the thickness of a disk drive is predetermined, the prior art shown in FIGS. 1, 2 and 3 has a disadvantage in that the sheets of dicks 7 cannot be increased much more than the limited value. On the contrary, when the number of sheets of disks 3 assembled are predetermined, the conventional disk drive has an another disadvantage in that the thickness of the disk drive cannot be reduced less than the limited value, since the space within a disk enclosure cannot be utilized effectively.

Furthermore, the lead wires 8 have to be laid along the axial direction in the approximate center of the suspension element 3, so that they do not disturb read/write operations of the magnetic head 6. Consequently, the prior art shown in FIG. 1 to 3 has a further disadvantage in that it is troublesome for the lead wires 8 to be arranged in a limited space between adjoining disks 7.

Figure 4:
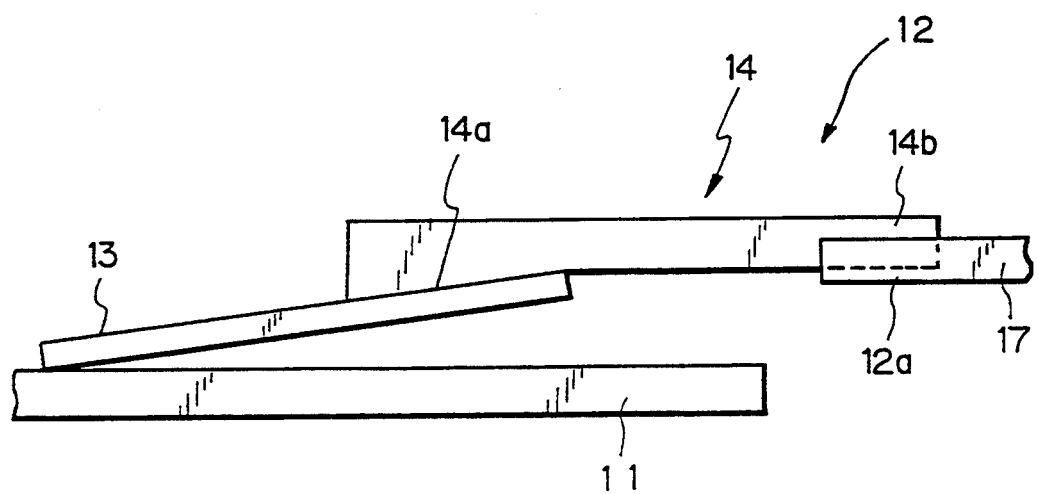
FIGS. 4, 5, 6, 7, 8, 9, 10, 11 and 12 are views showing a first preferred embodiment of a disk drive according to the present invention.
Figure 5:
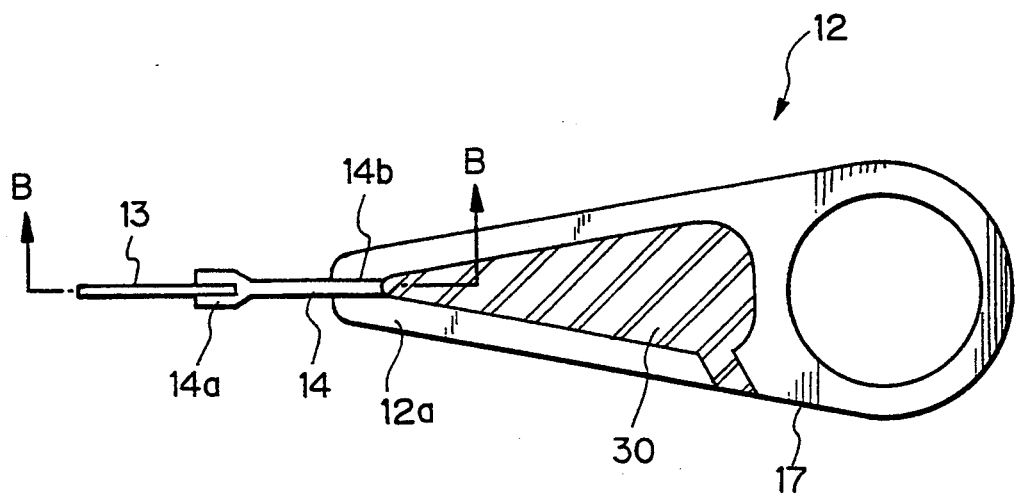
Figure 6:
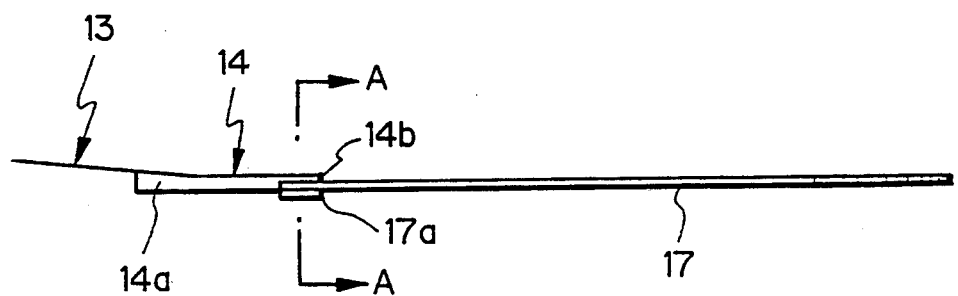
Figure 7:
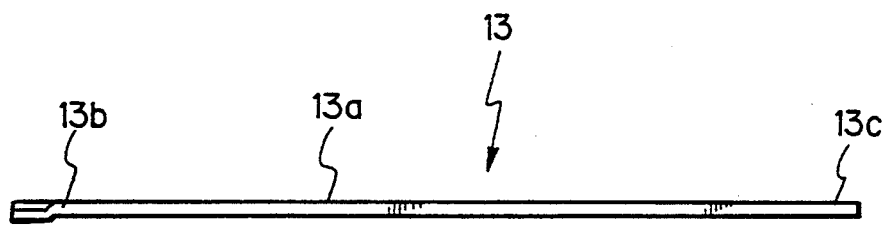
Figure 8:
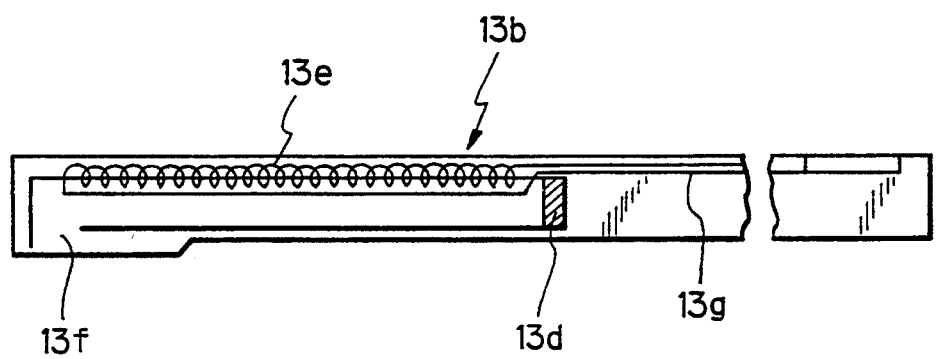
Figure 9:
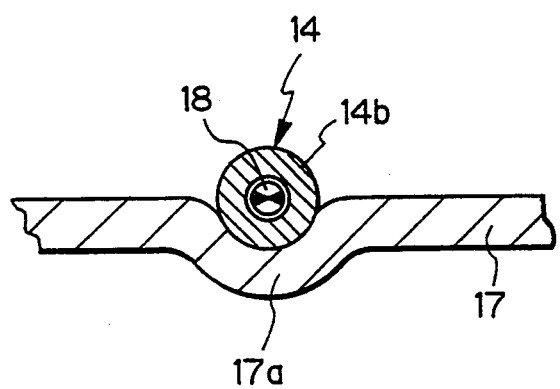
Figure 10:
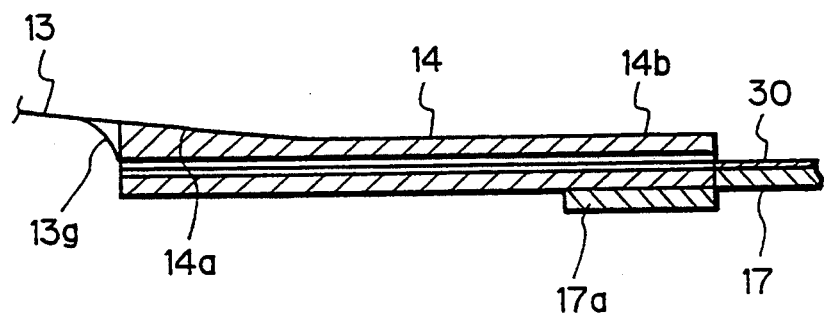
Figure 11:
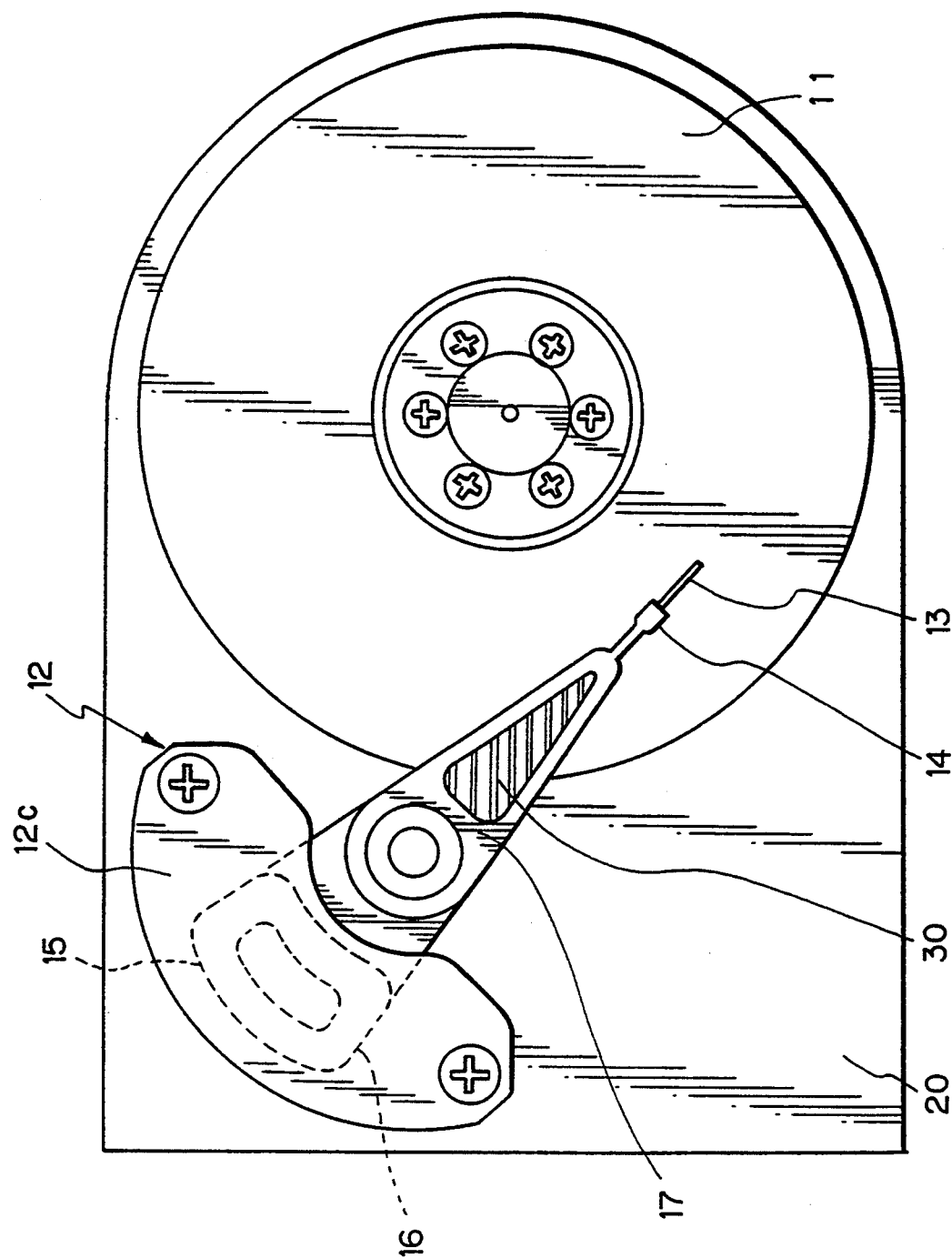
Figure 12:
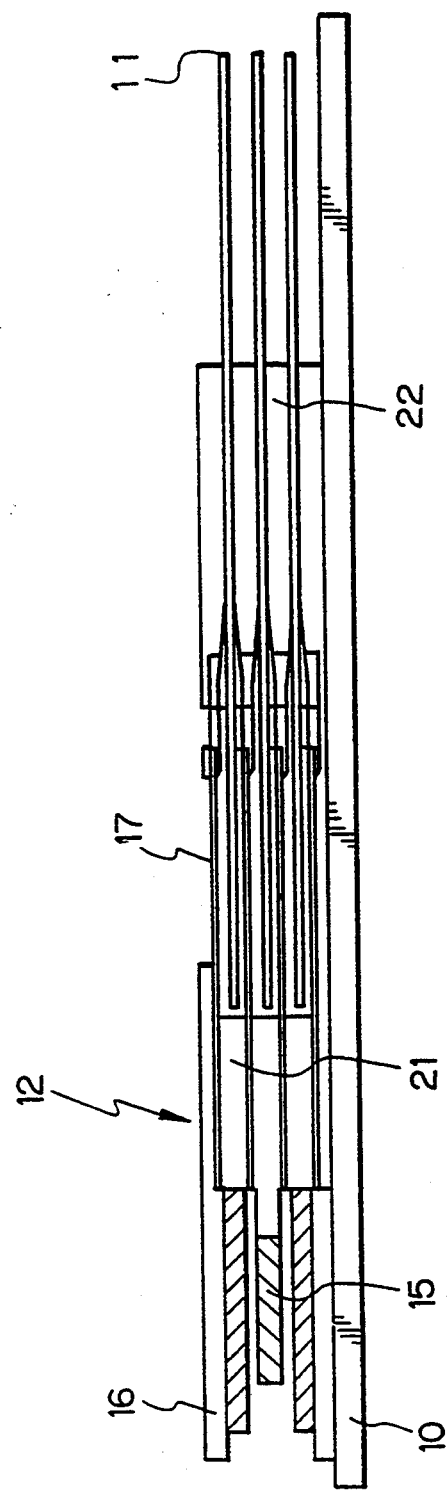

FIGS. 4 to 12 are views showing a first preferred embodiment of a disk drive according to the present invention. To be more specific, FIG. 4 is a simplified front view showing the characteristics of the present invention emphatically and FIG. 5 is a top view showing the main part of the magnetic disk drive and FIG. 6 is a front view of FIG. 5 and FIG. 7 is an enlarged front view showing a unitary magnetic head of FIG. 6 and FIG. 8 is an enlarged sectional view showing a unitary magnetic head of FIG. 8 and FIG. 9 is an enlarged sectional view taken along A—A of FIG. 6 and FIG. 10 is an enlarged sectional view taken along B—B of FIG. 5 and FIG. 11 is a top view showing the whole structure of the magnetic disk drive and FIG. 12 is a front view of FIG. 11. In some of FIGS. 4 to 11, positioners 12 are partially omitted for simplifying the drawings.

First, the whole structure of a preferred embodiment of the present invention will be explained with reference to FIGS. 4 to 12. In these figures, 20 denotes a base of the magnetic disk drive. On this base 20, plural sheets of disks (in FIG. 12, three sheets of disks are illustrated) are rotatably arranged in a laminated manner via spacers 22. These plural sheets of disks 11 constructed so as to be rotatably driven at high speed (for example, 3600 r.p.m.) by a spindle motor, which is representative of a disk driving means not shown in these figures.

Further in these figures, 12 denotes positioners that are rotatably mounted on a base 20 and movable in the direction of the tracks of the disks 11, respectively, so that the respective ends of the positioners can traverse the tracks.

A coil 15 is provided on the respective rotatable opposite ends of the positioners 12. More specifically, the above coal 15 is arranged inside the magnetic gap of a magnetic circuit 16 that is formed on the base 20. In this case, when an electric current is supplied to the above coil 15, a driving force is induced in the coil 15 and then a VCM (voice coil motor), which comprises the above coil 15 and forces the positioners 12 to rotate, operates as a positioner driving means.

Further, in the positioners 12 includes a positioner body portion 12c that constitutes a main part of each of the positioners 12, and a plurality of arms 17 (in FIG. 11, four arms) that are mounted in the positioner body portion 12c and extend toward the respectively corresponding surfaces of recording media of disks 11. To be more concrete, the arms 17 are arranged in a laminated manner around a rotation axis of the positioners 12 via spacers 21, respectively. On one tip portion of the arms 17 are arranged reproducing/recording elements that perform data read/write operations of data for the surfaces of recording media of the disks 11 via head supporting members 14, respectively.

Next, the above reproducing/recording elements will be explained in more detail, with reference to FIGS. 5 to 9. In the first preferred embodiment and the other embodiments described hereinafter, typically, an integrated unitary magnetic head 13 shown in FIG. 8 is utilized as the reproducing/recording element (for example, see U.S. Pat. No. 5,041,932, or announcement by Canstot Corporation in Data Storage 90 An International Forum; Sep. 10-12, 1990 Fairmont Hotel San Jose, Calif.). Henceforth the above integrated unitary magnetic head 13 will be described in detail with reference to the related figures. The integrated unitary magnetic head 13 consists of a body 13a made of a flexible thin sheet, such as a laminated sheet of Aluminum Oxide ($Al_2O_3$), a head portion 13b that is located on one tip portion of said body 13a and has an air gap for reproducing or recording on one surface of the body 13a, and a mounting portion 13c that is formed on the opposite tip portion of the body 13a.

Further, the whole weight of the integrated unitary magnetic head 13 is approximately 1 mg, which is much more reduced than a conventional MIG magnetic head. In the first preferred embodiment, it is designed so that the distance between the surface of the disk 11 and the surface of the corresponding arm 17 that confronts the surface of the disk 11 in the direction of lamination of the disk 11 is 0.3 to 0.6 mm.

Further, it is also designed such that the positioner 14 should be flexible with the range of 0.3 to 0.6 mm in the direction of lamination of the disk 11, when the integrated unitary magnetic head 13 is fixed on the tapered surface, which is formed on the head mounting portion 14a of the head supporting portion 14.

Further, the head portion 13a of the unitary magnetic head 13 will be described in more detail with reference to FIG. 8. The above head portion 13a consists of a yoke 13d, a coil 13e wound around the yoke 18d and an air gap 13f formed between both ends of the yoke 13d.

In this case, 13g denotes lead wires that are connected to the above coil 13e.

Further, in the first preferred embodiment comprises head supporting member 14 each having a tip end portion where a head mounting portion 14a is formed and a base end portion where a sliding portion 14b is formed. In the above head mounting portion 14a, the opposite tip portion of the body of each of the unitary magnetic heads 13 is fixed. The above embodiment further comprises guide portions 12a each of which is formed on one end of the arm 17 of each of the positioners 12 and with which the sliding portion 14b is engaged rotatably in the rolling direction and movable in the axial direction. In this case, each sliding portion 14b is adapted to be attached to the corresponding guide portion 12a. Here, the axial direction means the normal direction of the circle which the positioner delineates in rotating. Henceforth, the axial direction will be used in the above meaning in the whole specification.

To be more specific, each head supporting member 14 is made into an approximately hollow cylindrical form. Further, on the tip end portion thereof, the head mounting portion 14a, which includes a tapered surface, has a given inclination to the respectively corresponding surface of recording media of said disks 11. Further, the above tapered surface as adapted to be engaged with the mounting portion 13c of the unitary magnetic heads 13. On the contrary, the base end portion of the head supporting member 14 has a circular cylinder form and the sliding portion 14b is formed in the above base end portion. Further, material properties and dimensions, etc., of the above head supporting member are determined such that the head supporting member has sufficient stiffness to support the unitary magnetic head stably.

Further, on one tip portion of the arm 17, a guide groove 17a is formed that extends toward the axial direction of the arm 17 and has a semicircular form in its section. Further, the form of the above guide groove 17a is selected so that the sliding portion 14b can rotate and the arm 17 can move in the axial direction.

Further, in FIG. 5, 30 denotes an FPC, which transmits read/write signals from the unitary magnetic head 13 to an integrated circuit for read/write operations, arranged on the side of the positioner 12. One end of the FPC 30 extends toward the vicinity of the base end portion of the head supporting member 14. On the other hand, lead wires 13g extending from the unitary magnetic head 13 can pass through the hollow portion inside the corresponding head supporting member 14, and are connected to the corresponding FPC 30.

Further, in the first preferred embodiment, with regard to the method for fixing the unitary magnetic head 13, the method utilizing a thermohardening adhesive or the method utilizing spot welding by a laser or the like appears reasonable. In this case, the fixing process of the unitary magnetic head 13 is preferably executed by using a thermohardening adhesive. To be more concrete, first, the mounting portion 13c is mounted on the tapered surface of the head supporting member 14 by means of the thermohardening adhesive. Next, after the sliding portion 14b of the head supporting member 14 located on the guide groove 17a and the degree of angle to the disk 11, etc., are adjusted, the adhesive is heated to the curing temperature to become sufficiently hard.

In FIGS. 4 to 12 again, a sequence of operations of the construction of a disk drive according to the first preferred embodiment will be described. In this case, each disk 13 is rotatably driven by a spindle motor as a disk driving means (not illustrated in these figures).

First, when an electric current is supplied to the coil 15, which is arranged inside the magnetic gap of a magnetic circuit 16, a driving force is induced in the coil 15 and then each positioner 12 is rotatably driven for the base 20. Next, each positioner 12 rotated and therefore the head portion 18b of the unitary magnetic head 13 gains access to a desired track of the corresponding disk 11 and finally read/write operations of data are performed for the above disk 11.

In such a construction, the suspension element and spacer are not necessary, which is different from the construction according to a prior art. Further, a mounting portion 13b of an integrated unitary magnetic head 13 of a thin sheet is fixed on a tapered surface of the head supporting member 14.

In the first embodiment, particularly, lead wires 13g of each unitary magnetic head 13 is constructed to pass through the hollow portion inside each of the supporting members 14. Consequently, a set of lead wires 13g between the adjoining unitary magnetic head 13 do not interface with each other, and it becomes possible for the distance between adjoining disks 11 to be decreased significantly.

Furthermore, in this case, after the sliding portion 14b has been securely engaged with the corresponding guide groove 17a, the degree of angle between the unitary magnetic head 13 and the disk 11 can be finely adjusted. Therefore, the unitary magnetic head 13 can be easily attached to the corresponding positioner 12 with a higher degree of accuracy.

Consequently, it becomes theoretically possible for the distance between adjoining disks 13 to be only slightly larger than the thickness of the arm 18. To be more concrete, in the construction according to a prior art, the distance between adjoining disks becomes approximately 3 mm at the most. On the contrary in the construction according to a first preferred embodiment, the distance between the disks can be reduced to a value as small as 1.5 to 2.5 mm.

Further, in the prior art, the total weight of the head supporting structure including a magnetic head, a suspension element, a gimbal and a spacer is approximately 300 mg. On the contrary, the weight of an integrated magnetic head can be reduced to a value of approximately 1 mg. Further, because of the reduction of weight in an integrated unitary magnetic head, the rigidity of the arm 17 is lowered, which leads to the reduction of the weight of the arm 17. Consequently, the moment of inertia can be reduced significantly, and higher speed data access can be performed, compared with a prior art.

Figure 13:
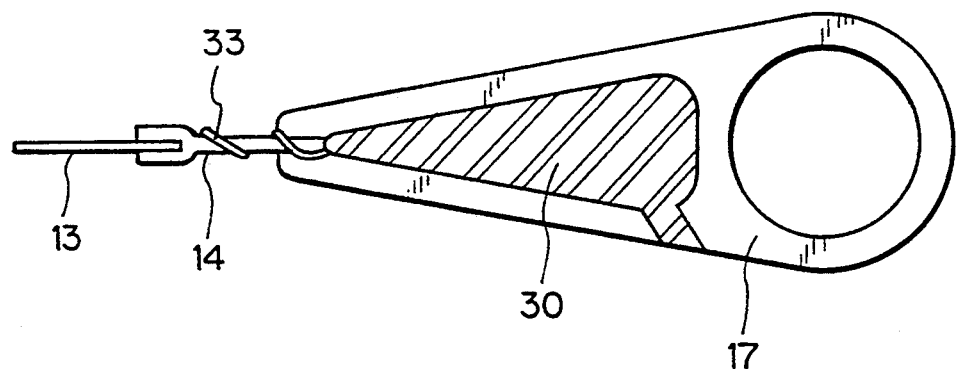
FIGS. 13, 14, 15 and 16 are views showing a second preferred embodiment of a disk drive according to the present invention.
Figure 14:
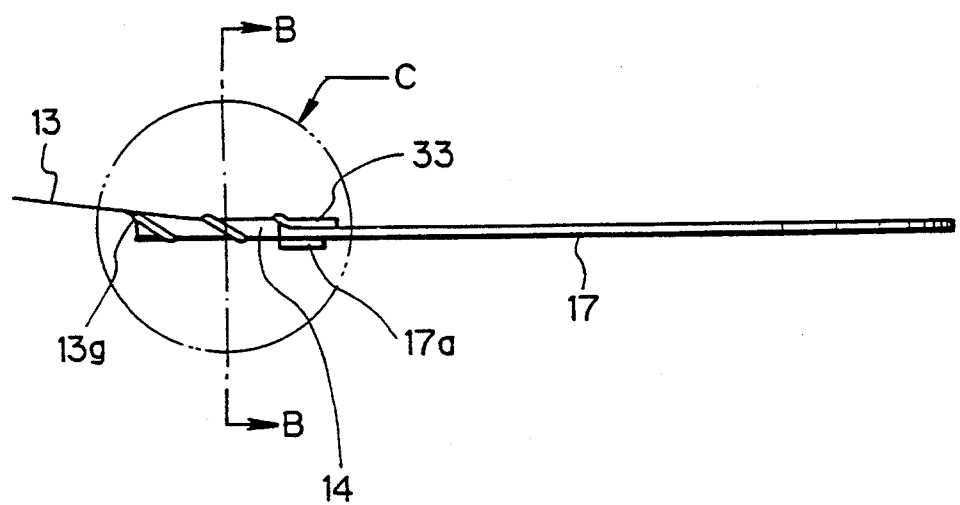
Figure 15:
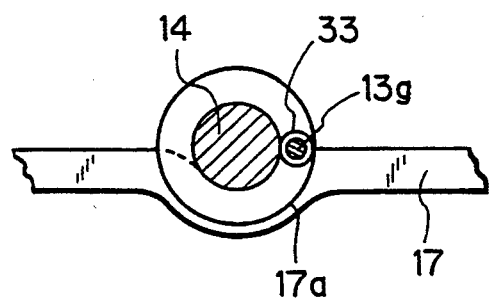
Figure 16:
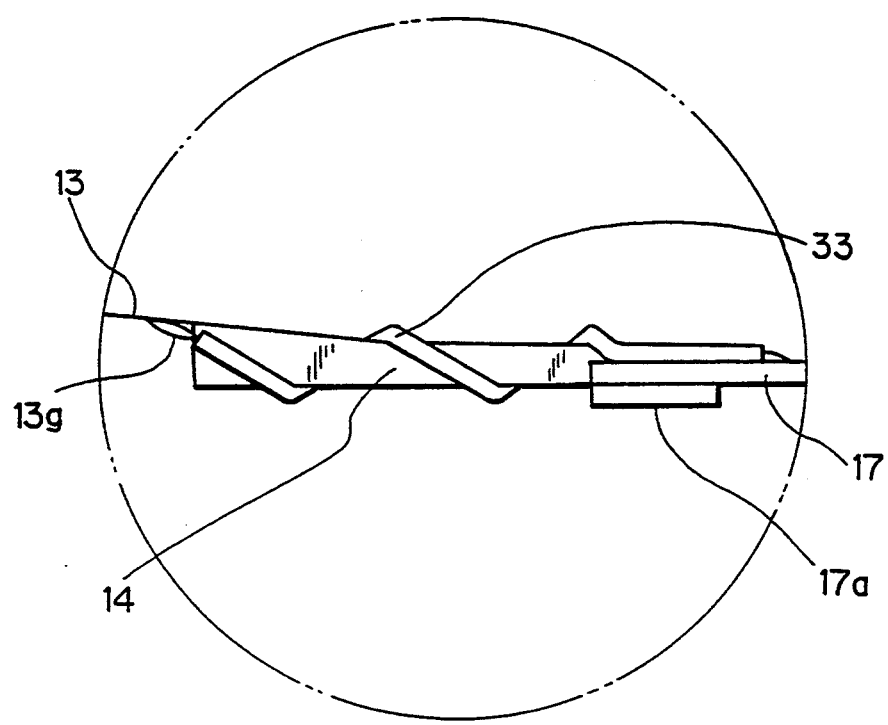

FIGS. 13 to 16 are views showing a second preferred embodiment of a disk drive according to the present invention. To be specific, FIG. 13 is a top view showing the main part of the magnetic disk drive and FIG. 14 is a front view of FIG. 13 and FIG. 15 is an enlarged sectional view taken along B—B and FIG. 16 is an enlarged front view showing portion C of FIG. 14. Henceforth, any component that is previously mentioned will be referred to using the same reference number.

As shown in FIGS. 13 and 16, the construction of a disk drive in a second preferred embodiment is similar to that of a disk drive in a first preferred embodiment. However, the method for connection between lead wires 13g and FPC 30 is different from that of the first embodiment. To be more specific, in the first embodiment, lead wires 13g are arranged to pass through the hollow portion inside the corresponding head supporting member 14, as described before. On the contrary, in the third second embodiment, lead wires 13g are arranged to pass through an insulated tube 33 and to be wound around the outer cylindrical surface of the corresponding head supporting member 14. Accordingly, in the latter embodiment, the above hollow portion is not always necessary.

The above second embodiment has the same advantage as the first embodiment, particularly in that the distance between adjoining disks can be reduced and the weight of the head supporting structure can be decreased significantly and the unitary magnetic head can be easily attached to the corresponding positioner with a higher degree of accuracy.

Figure 17:
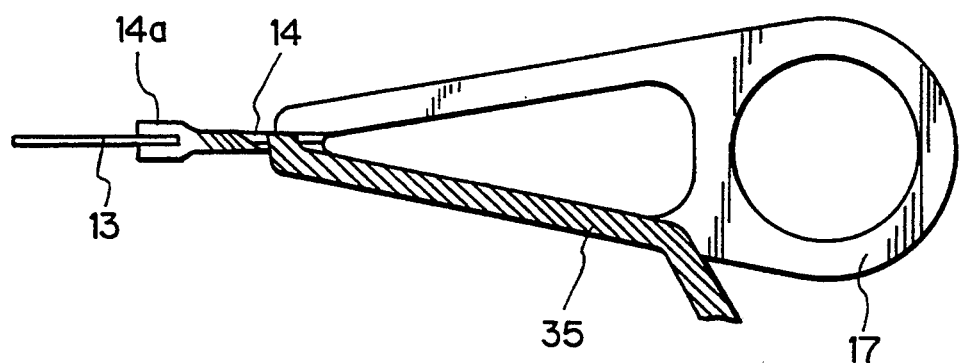
FIGS. 17, 18, 19 and 20 are views showing a third preferred embodiment of a disk drive according to the present invention.
Figure 18:
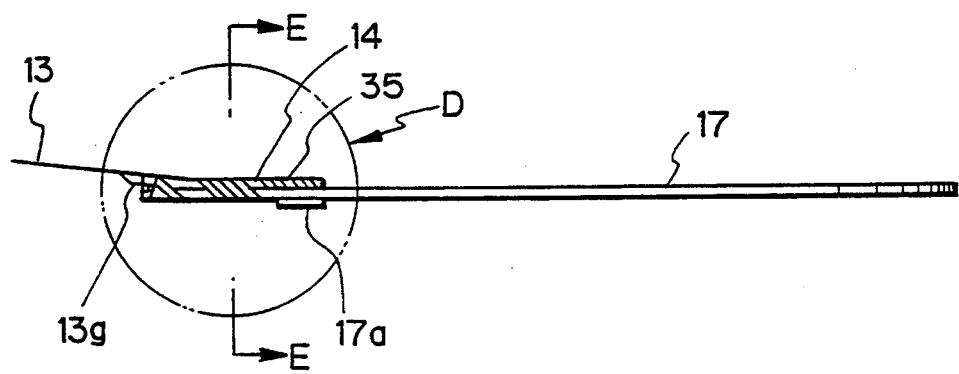
Figure 19:
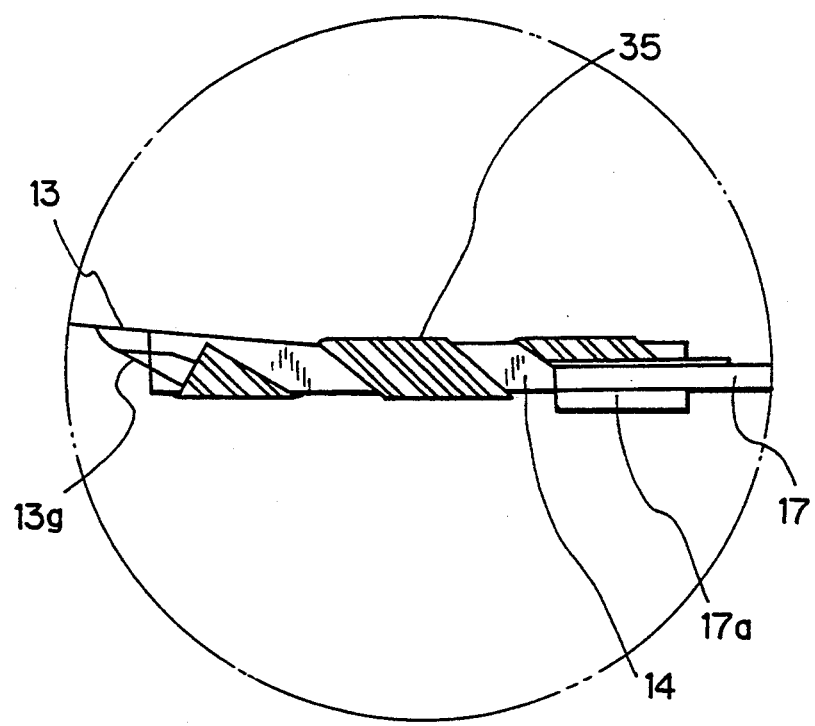
Figure 20:
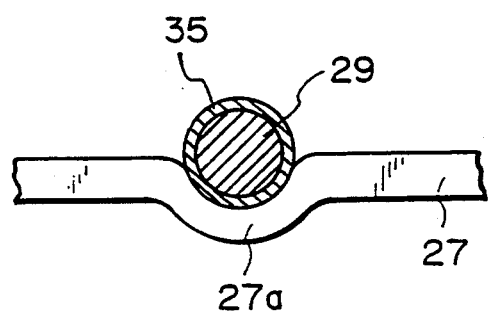

FIGS. 17 to 20 are views showing a third preferred embodiment of a disk drive according to the present invention. To be more specific, FIG. 17 is a top view showing the main part of the magnetic disk drive and FIG. 18 is a front view of FIG. 17 and FIG. 19 is an enlarged front view showing portion D of FIG. 18 and FIG. 20 is an enlarged sectional view taken along E—E of FIG. 16.

As shown in FIGS. 17 to 20, the construction of a disk drive in a third preferred embodiment is also similar to that of a disk drive in a first preferred embodiment. However, the method for connection between lead wires 13g and an FPC 30 (FPC 35) is different from that of the first embodiment. To be more specific, in the second embodiment, an FPC 35 is arranged from one tip portion toward the opposite tip portion of one side area on one surface of the arm 17. Further, one end of the above PPC 35 is wound around the outer cylindrical surface of the corresponding head supporting member 14 and in turn the lead wires 13g of the corresponding unitary magnetic head 13 are connected to one end of the FPC 35.

Also, the above third embodiment has the same advantage as the first embodiment, particularly in that the distance between adjoining disks can be reduced and the weight of the head supporting structure can be decreased significantly and the unitary magnetic head can be easily attached to the corresponding positioner with a higher degree of accuracy.

Furthermore, in this case, since an FPC 35 is wound directly around the outer cylindrical surface of the corresponding head supporting member 14, a set of lead wires 13g of the adjoining unitary magnetic head 13 do not interfere with each other, and it becomes possible for the distance between adjoining disks 11 to be decreased more than the distance therebetween in the previous embodiments.

Figure 21:
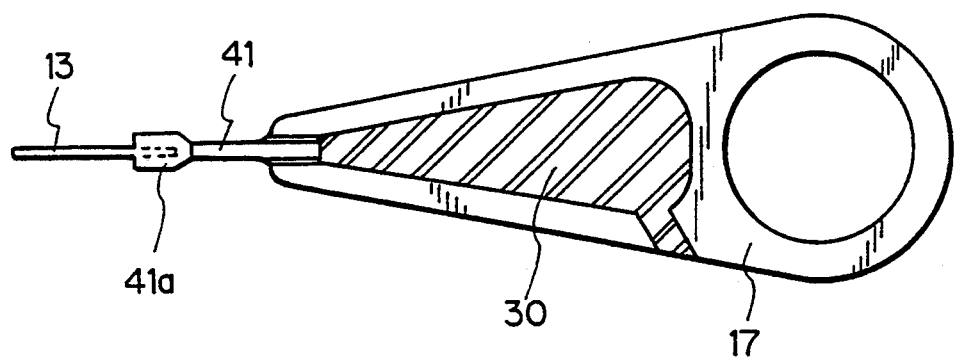
FIGS. 21, 22, 23 and 24 are views showing a fourth preferred embodiment of a disk drive according to the present invention.
Figure 22:
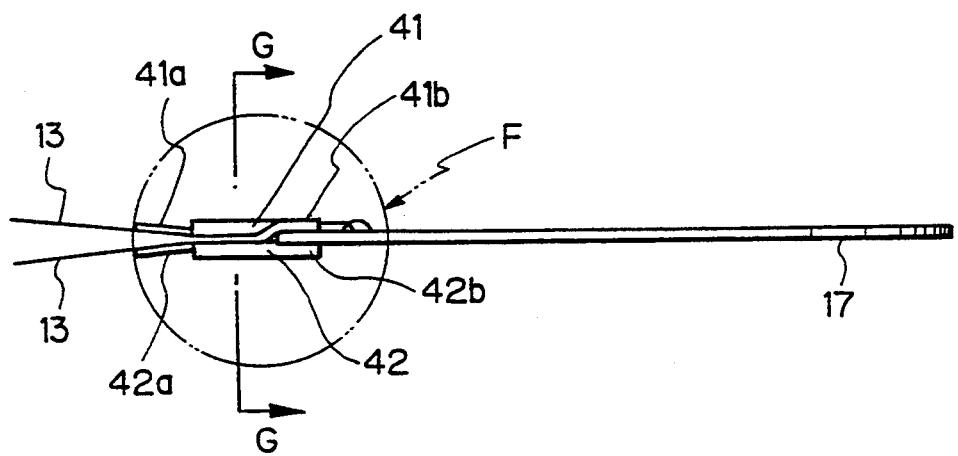
Figure 23:
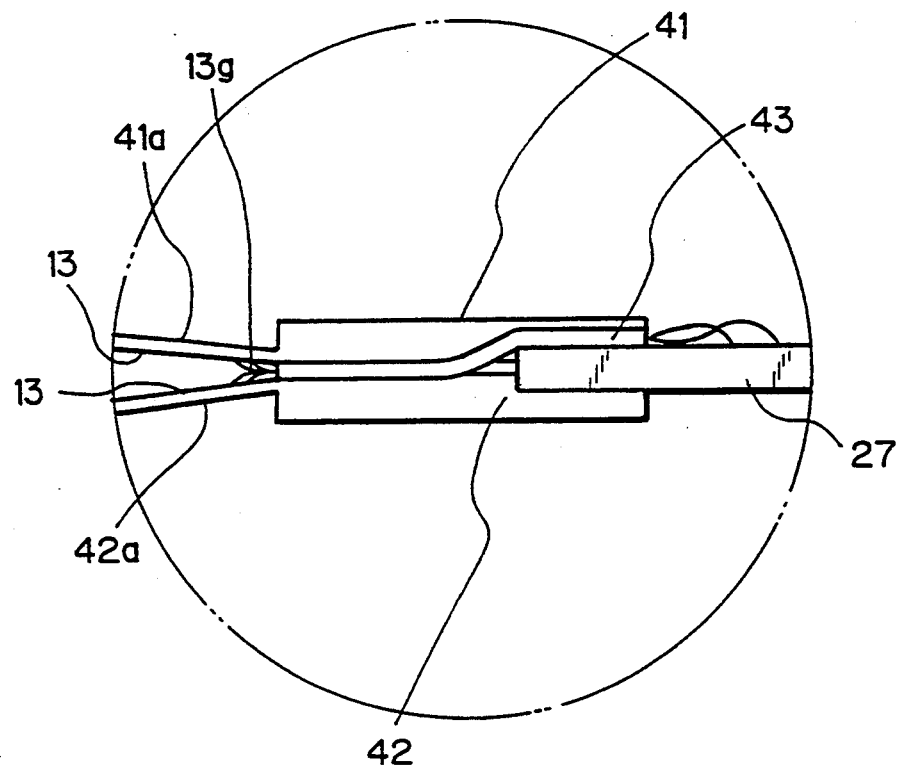
Figure 24:
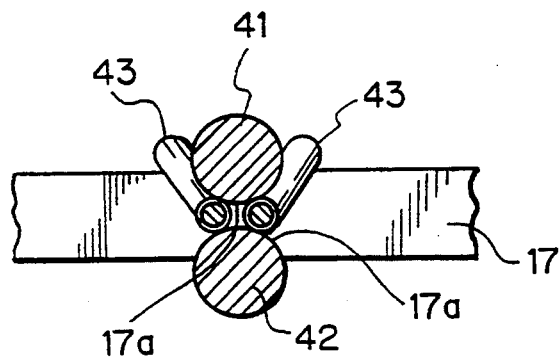

FIGS. 21 and 24 are views showing a fourth preferred embodiment of a disk drive according to the present invention. To be more specific, FIG. 21 is a top view showing the main part of a disk drive and FIG. 22 is a front view of FIG. 21 and FIG. 23 is an enlarged front view showing portion F of FIG. 22 and FIG. 24 is an enlarged sectional view taken along G—G of FIG. 22.

In these figures, arms 17 are located between the laminated disks 11, respectively. On the upper and lower sides of one tip portion of each arm 17, a first guide groove 17a and a second guide groove 17a are formed respectively, each of which extends toward the axial direction of the arm 17 and has a semicircular form in section.

Further, a first head supporting member unit 41 and a second head supporting member unit 42 are made into approximately circular cylindrical form. On the tip and portion of each of the above units, each tapered surface 41a, 42a is formed, which inclines in the direction of a recording medium of each disk 11 and on which each unitary magnetic head 13 is fixed. On the base end portion of each of the above units, each guide portion 41b, 42b is formed, which is arranged on each of the above guide grooves 17a.

Further, the forms of the above guide grooves 17a are adjusted previously so that sliding portions 14b of the first and second head supporting member units 41, 42 can rotate in the rolling direction and can move in the axial direction, respectively.

In this case, the lead wires 13g of each unitary magnetic head 13 pass through insulated tubes 43 that are arranged in a space formed between the first and second head supporting member units 41, 42. Further, the above lead wires 13g extending from the above insulated tubes 43 are connected to the corresponding FPC 30 on the arm 17.

Also, the above fourth embodiment has the same advantage as the first embodiment mentioned above. In this case, similar to the third embodiment, since lead wires 13g are arranged to pass through insulated tubes 43, and utilizing a space formed between the first and second head supporting member units 41, 42, a set of lead wires 13g of the adjoining unitary magnetic head 13 do not interfere with each other, and it becomes possible for the distance between adjoining disks 11 to be decreased significantly.

Figure 25:
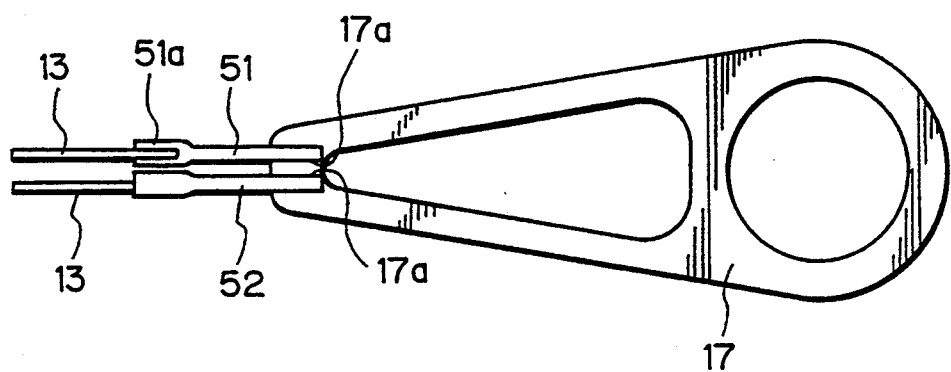
FIGS. 25, 26, and 27 are a view showing a fifth preferred embodiment of a disk drive according to the present invention.
Figure 26:
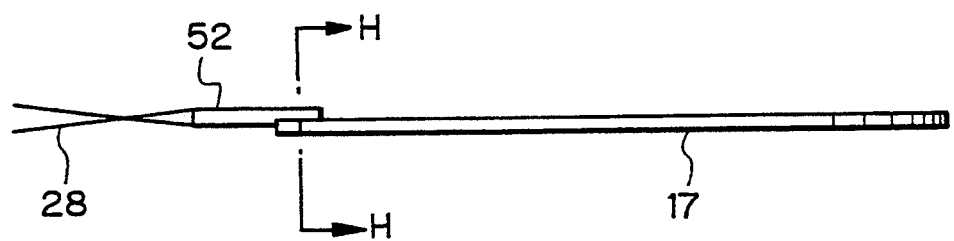
Figure 27:
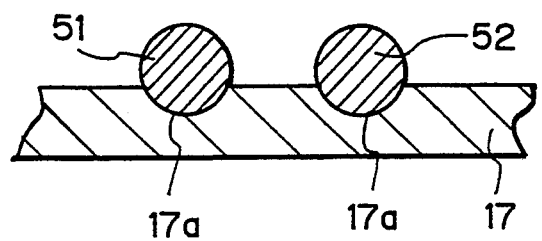

FIGS. 25 to 27 are views showing a fifth preferred embodiment of a disk drive according to the present invention. To be more specific, FIG. 25 is a top view showing the main part of a disk drive and FIG. 26 is a front view of FIG. 25 and FIG. 27 is an enlarged sectional view taken along H—H of FIG. 25.

In these figures, arms 17 are also located between the laminated disks 11, respectively, similar to the fourth embodiment. However, the method for mounting the head supporting members on the arms of the fifth embodiment is different from that of the fourth embodiment. To be more specific, in the fourth embodiment, the first head supporting member unit 41 and the second head supporting member unit 42 are fixed on both the upper and lower sides of one tip portion of each arm 17. On the contrary, in the fifth embodiment, the first guide groove 17a and a second guide groove 17a are formed in parallel formation on the one side of one tip portion of each arm 17. Further, on the first and second guide grooves 17a, the first and the second head supporting member units 51, 52 are mounted respectively, so that two tapered surfaces 51a, 51b confront the corresponding surfaces of recording media of the upper and lower disk.

Also, the above fifth embodiment has the same advantage as all previous embodiments, particularly in that the distance between adjoining disks can be reduced and the weight of the head supporting structure can be decreased significantly and the unitary magnetic head can be easily attached to the corresponding positioner with a higher degree of accuracy.

Figure 28:
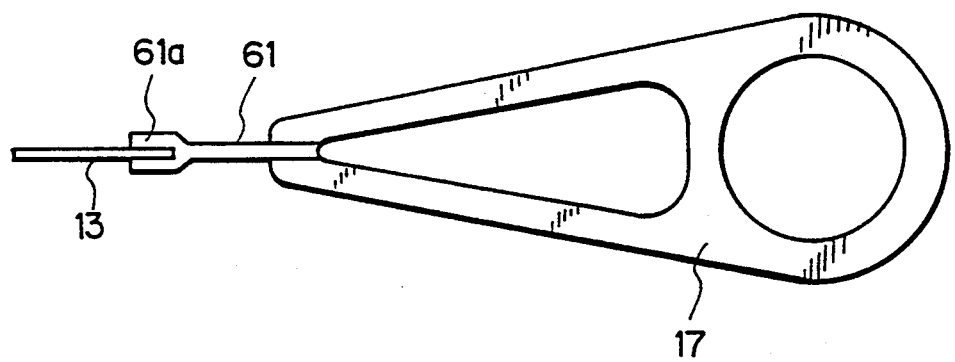
FIGS. 28, 29 and 30 are views showing a sixth preferred embodiment of a disk drive according to the present invention.
Figure 29:
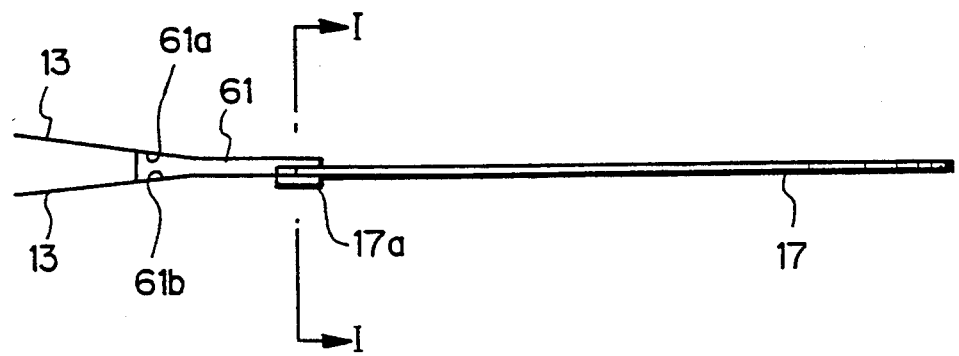
Figure 30:
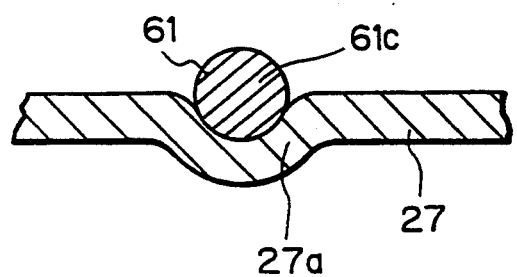

FIGS. 28 to 30 are views showing a sixth preferred embodiment of a disk drive according to the present invention. To be more specific, FIG. 28 is a top view showing the main part of a disk drive and FIG. 29 is a front view of FIG. 28 and FIG. 30 is an enlarged sectional view taken along I—I of FIG. 29.

As is apparent from FIG. 28 to 30, the structure of the head supporting members of the sixth embodiment is different from that of the first embodiment. To be more specific, in FIG. 28 to 30, on the tip end portion of each head supporting member, a first tapered surface 61a and a second tapered surfaces 61b are formed, which incline toward the respectively corresponding surfaces of recording medium of the upper and lower disks 11. Further, on the first and second tapered surface 61a, 61b, two unitary magnetic heads 17 are respectively fixed, which perform read/write operations of various data for the disks 11. Further, a sliding portion 61c, which is formed on the base end portion of each head supporting member 61, is mounted on guide grooves 27a of each arm 27.

Also, the above sixth embodiment has the same advantage as all previous embodiments, particularly in that the distance between adjoining disks can be reduced and the weight of the head supporting structure can be decreased significantly and the unitary magnetic head can be easily attached to the corresponding positioner with a higher degree of accuracy.

Figure 31:
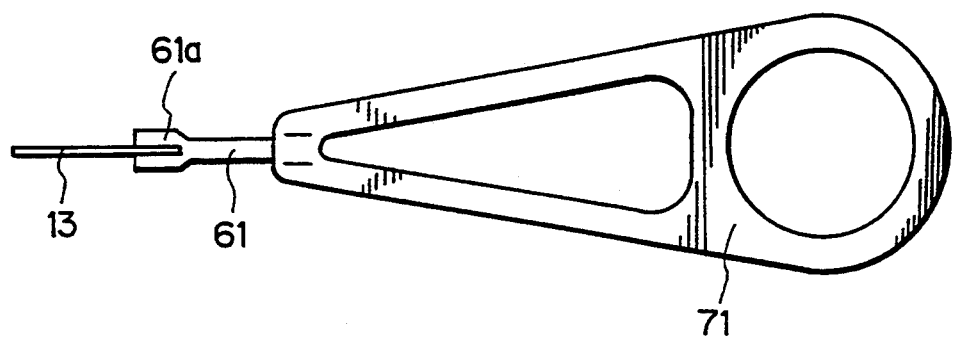
FIGS. 31, 32 and 33 are views showing a seventh preferred embodiment of a disk drive according to the present invention.
Figure 32:
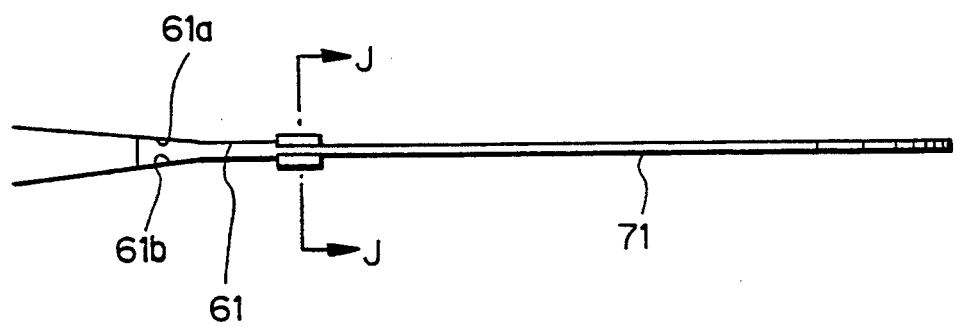
Figure 33:
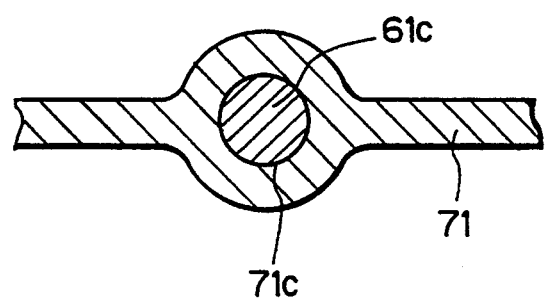

FIGS. 31 to 33 are views showing an seventh preferred embodiment of a disk drive according to the present invention. To be more specific, FIG. 31 is a top view showing the main part of a disk drive and FIG. 32 is a front view of FIG. 31 and FIG. 33 is an enlarged sectional view taken along J—J of FIG. 32.

In these figures, a guide hole 71c is engraved inside one tip portion of each arm 71 as the guide portion, instead of the guide groove 27a mentioned in the sixth embodiment. The above guide hole 71c has a circular form in section. The sliding portion 61c of each head supporting member 61 is mounted on the above guide hole 71c.

Also, the above seventh embodiment has the same advantage as all previous embodiments, particularly in that the distance between adjoining disks can be reduced and the weight of the head supporting structure can be decreased significantly and the unitary magnetic head can be easily attached to the corresponding positioner with a higher degree of accuracy.

Figure 36:
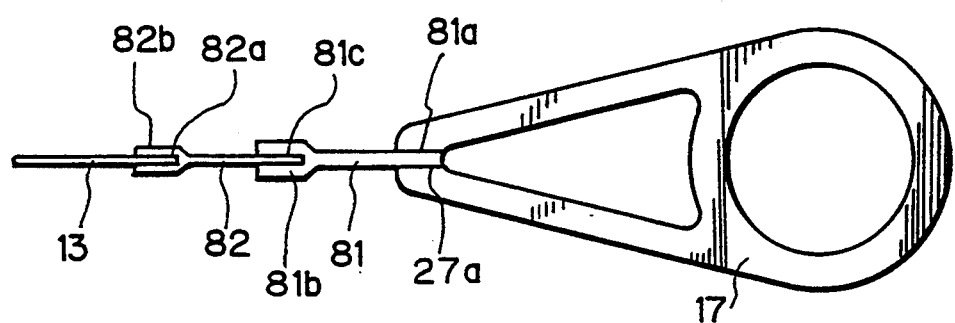
Figure 37:
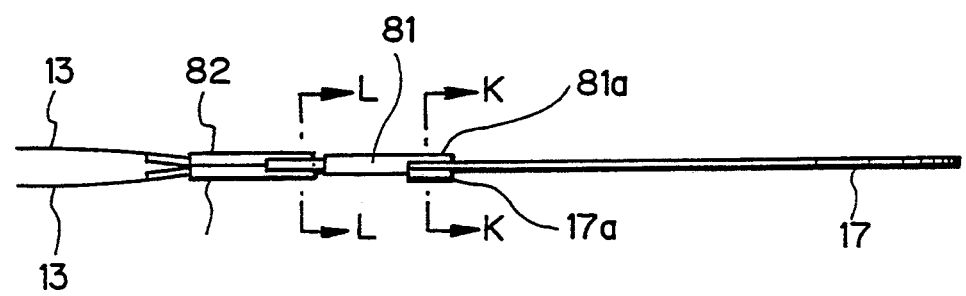
Figure 35:
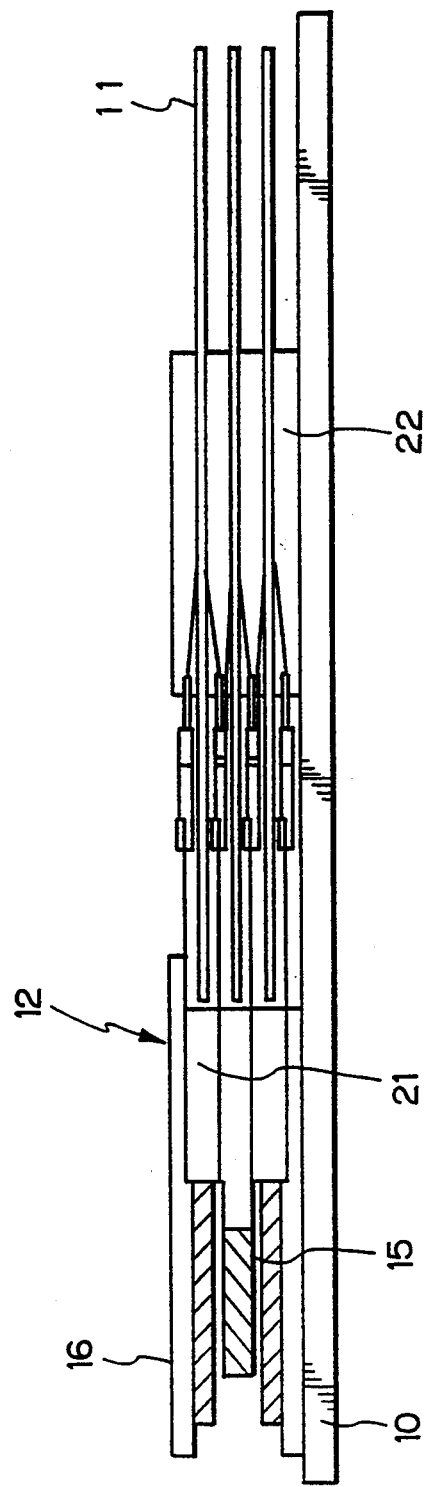
Figure 38:
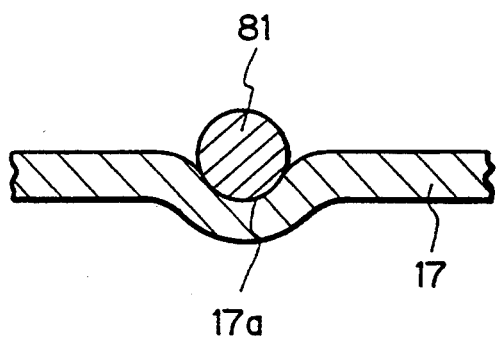
Figure 39:
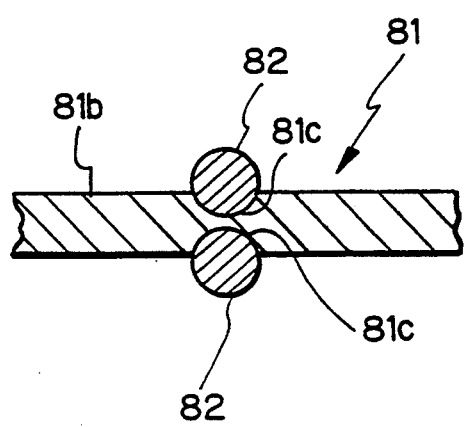

FIGS. 34 to 37 are views showing an eighth preferred embodiment of a disk drive according to the present invention. To be more specific, FIG. 34 is a top view showing the whole structure of the magnetic disk drive and FIG. 35 is a front view of FIG. 34 and FIG. 36 is an enlarged top view showing the arm of a positioner and FIG. 37 is a front view of FIG. 36.

As shown in these figures, the construction of the head supporting member of the eighth embodiment is different from that of the first embodiment. To be more specific, in these figures, a second guide groove 27a, which extends toward the axial direction of each arm 17, is formed on one tip portion of the arm 17. On the above second guide groove 27a, a second sliding portion 81a, which is formed on the base end portion of a middle supporting member 81, is mounted rotatably and movably in the axial direction. On the tip end portion of the above middle supporting member, a flat surface 81b shown in FIG. 36 is formed. On the upper and lower side of the above flat surface 81b, first guide grooves 81c are formed. Further, on the two first guide grooves 81c, each head supporting member 82, having the same shape as described in the fourth embodiment, is mounted. On the base end portion of each head supporting member 82, is a first guide portion 82a, which is rotdrably engaged with the first guide groove 81c. On the tip end portion of each head supporting member 82, a tapered surface 82b is formed, which inclines toward the corresponding surface of recording media of each disk 11 and on which an integrated unitary magnetic head 13 is located.

Also, the above eighth embodiment has the same advantage as all previous embodiments, particularly in that the distance between adjoining disks can be reduced and the weight of the head supporting structure can be decreased significantly and the unitary magnetic head can be easily attached to the corresponding positioner with a higher degree of accuracy.

Furthermore, in this case, the present invention is not limited to the above mentioned embodiment. In the descriptions of these embodiments, the sliding portion of each head supporting member, which has a circular cylindrical form, has been illustrated, and also the guide groove or guide hole has been illustrated as the guide portion, however, the sliding portion may have a groove and hole and the guide portion may have a cylindrical form.

Figure 40:
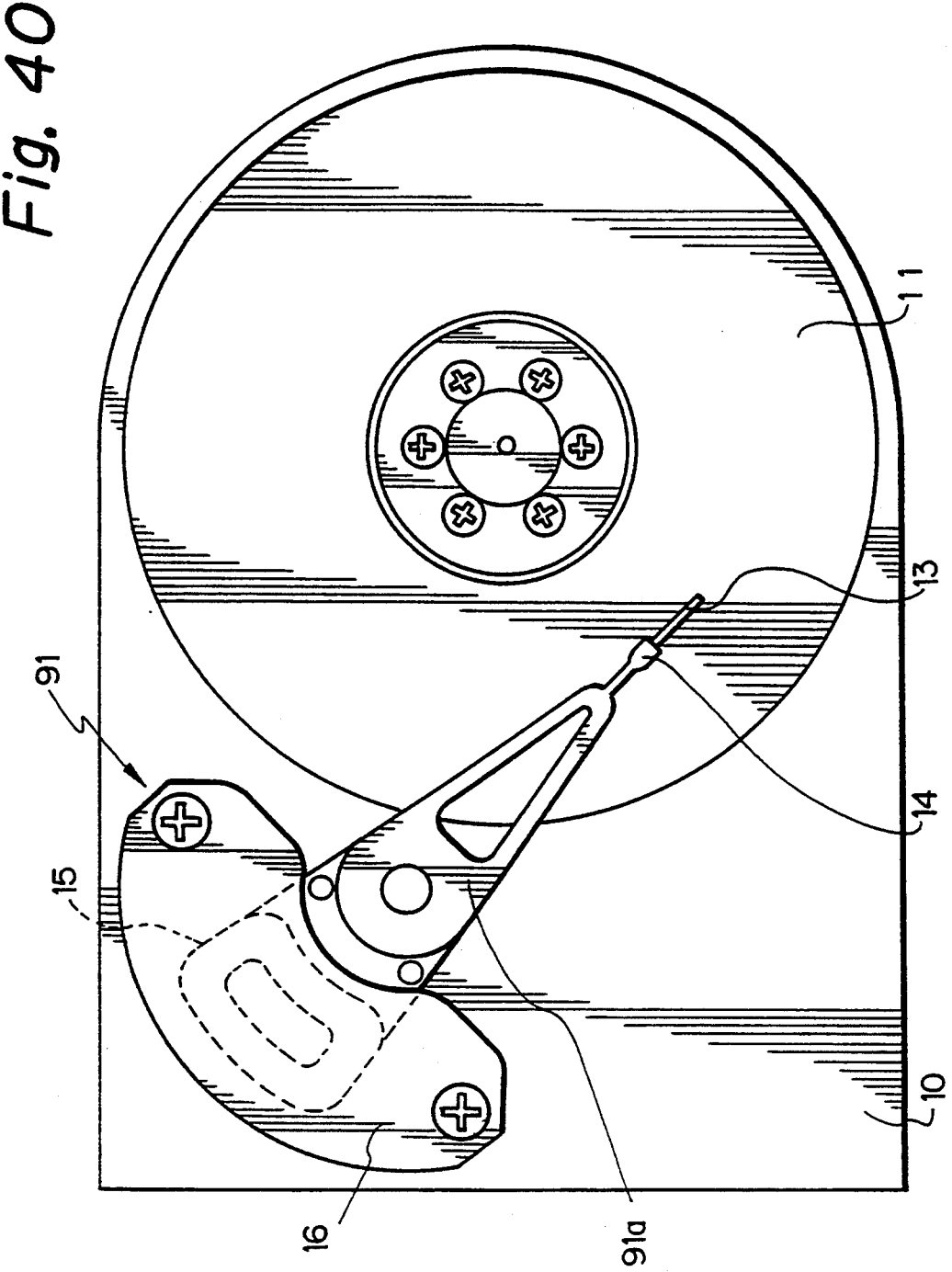
FIGS. 40 and 41 are views showing a ninth preferred embodiment of a disk drive according to the present invention.
Figure 41:
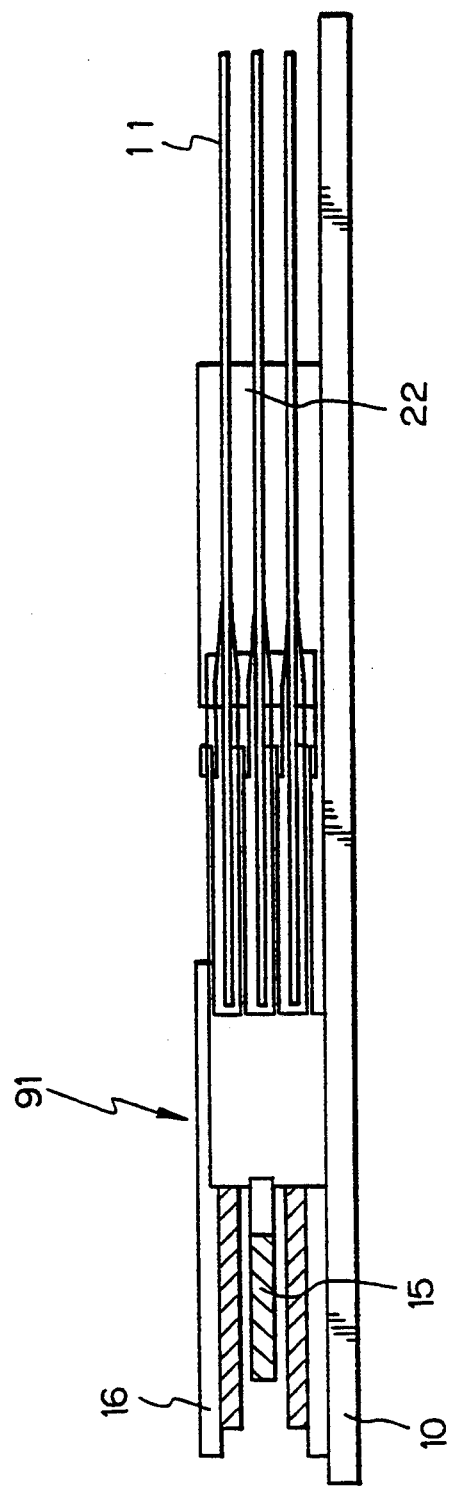

FIGS. 40 and 41 are views showing a ninth preferred embodiment of a disk drive according to the present invention. To be more specific, FIG. 40 is a top view showing the whole structure of the magnetic disk drive and FIG. 41 is a front view of FIG. 40.

As shown in FIGS. 40 and 41, the construction of a disk drive in a second preferred embodiment is similar to that of a disk drive in a first preferred embodiment. However, the structure of the positioner 91 of the ninth embodiment is different from that of the first embodiment. To be more specific, in the first embodiment, the arms 17 of the positioners 12 and the spacers 22 are laminated alternately and the arms 17 are composed of the different members from the positioners 14. In the second embodiment, however arm portions 91a functioning as the arms 17 described before are integrated with positioners 12, respectively. In this case, the above arm portions 91a can be fabricated by means of cutting.

Figure 42:
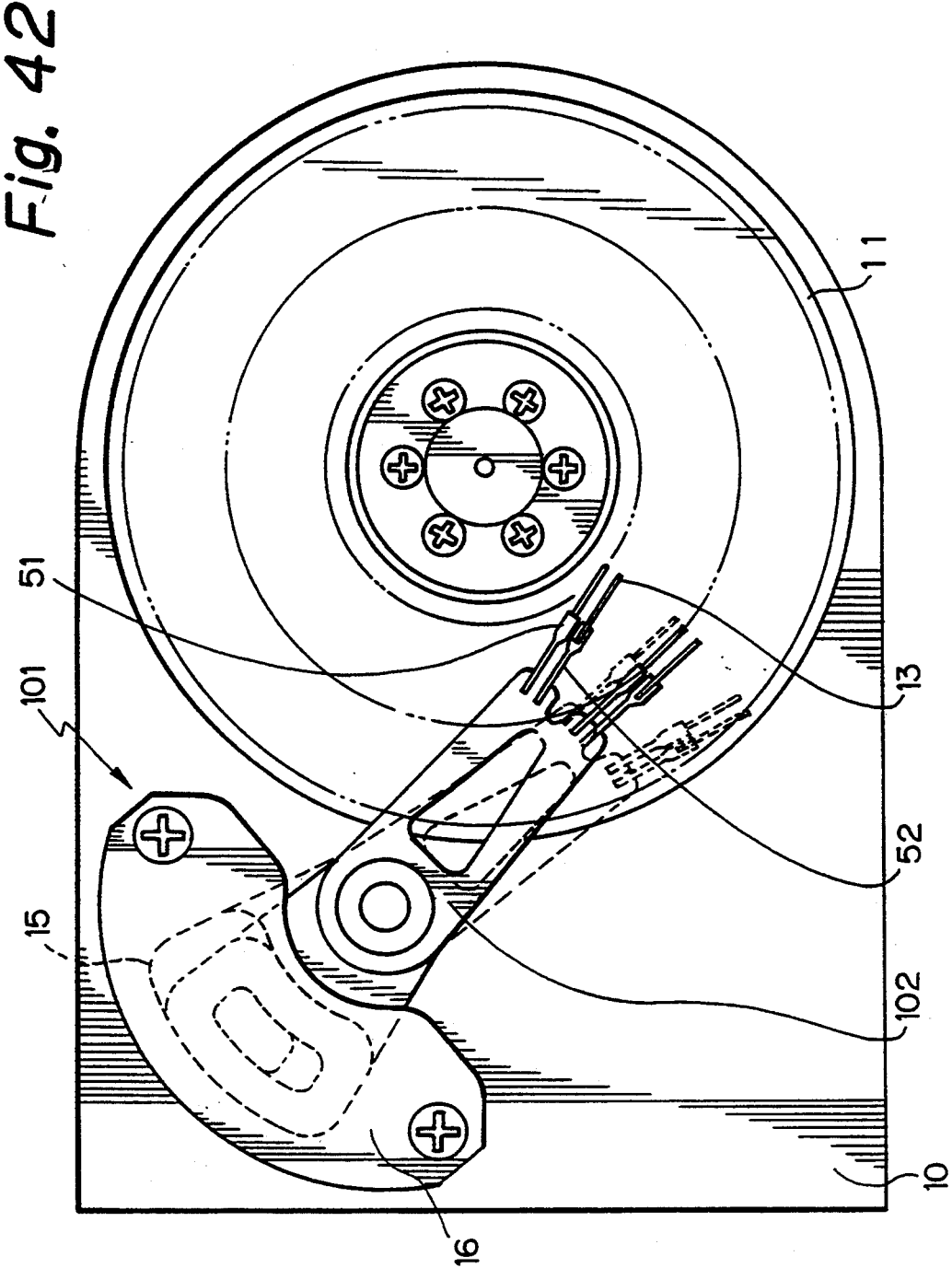
FIGS. 42, 43, 44, 45 and 46 are views showing a tenth preferred embodiment of a disk drive according to the present invention.
Figure 43:
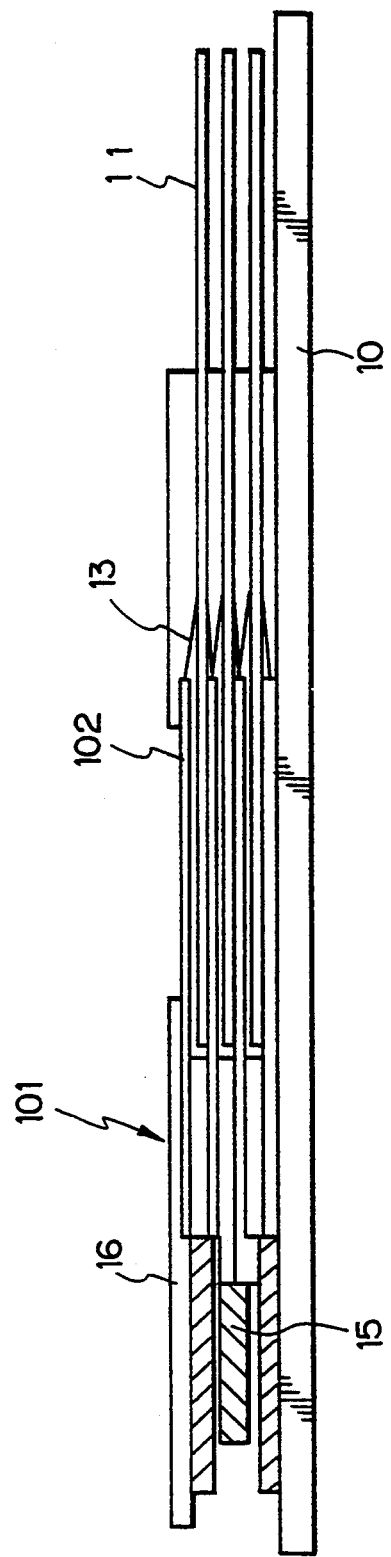
Figure 44:
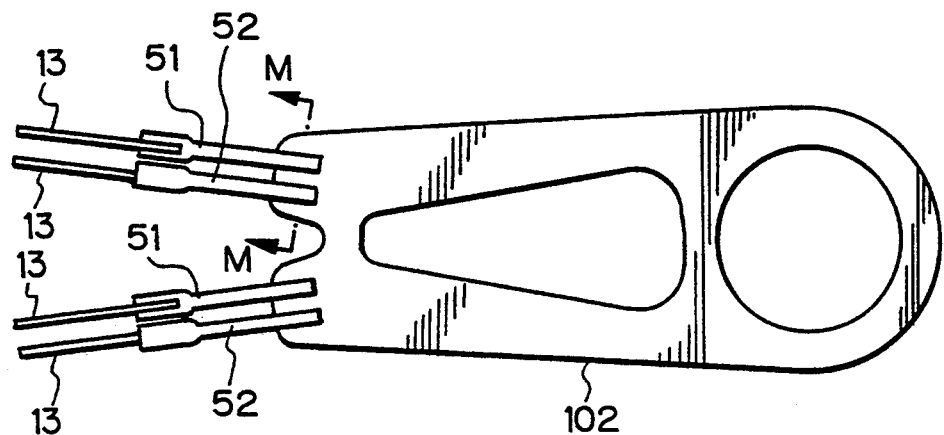
Figure 45:
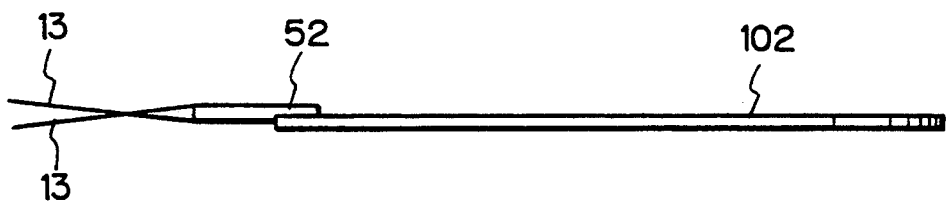
Figure 46:
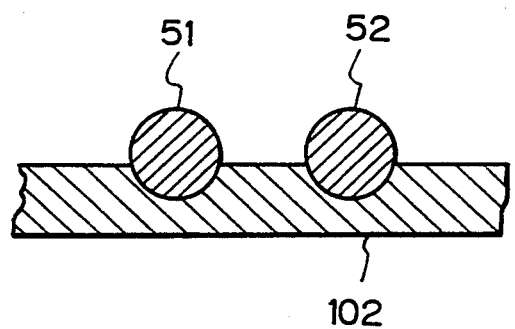

FIGS. 42 to 46 are views showing a tenth preferred embodiment of a disk drive according to the present invention. To be more specific, FIG. 42 is a top view showing the whole structure of the magnetic disk drive and FIG. 43 is a front view of FIG. 42 and FIG. 44 is an enlarged top view showing the arm of the positioner FIG. 42 and FIG. 45 is front view of FIG. 44 and FIG. 46 is an enlarged sectional view taken along M—M of FIG. 44.

As apparent from these figures, the structure of positioners 101 of the ninth embodiment is different from that of the first embodiment. To be more specific, in FIG. 42 to 46, one end of each of the arms 102 of the positioners 101 is divided into two branches, on which two pairs of (four) unitary magnetic heads 13 are fixed, respectively, via the corresponding head supporting members 51, 52 shown in the fifth embodiment, so that the two pairs of unitary magnetic heads 13 can perform read/write operations for the internal peripheral part and the external peripheral part of the tracks of each disk 11, respectively.

In such a construction, a plurality of unitary magnetic heads can be used simultaneously at each disk, read/write operations can be performed at a higher speed than a conventional disk drive and the access time is shortened.

Figure 47:
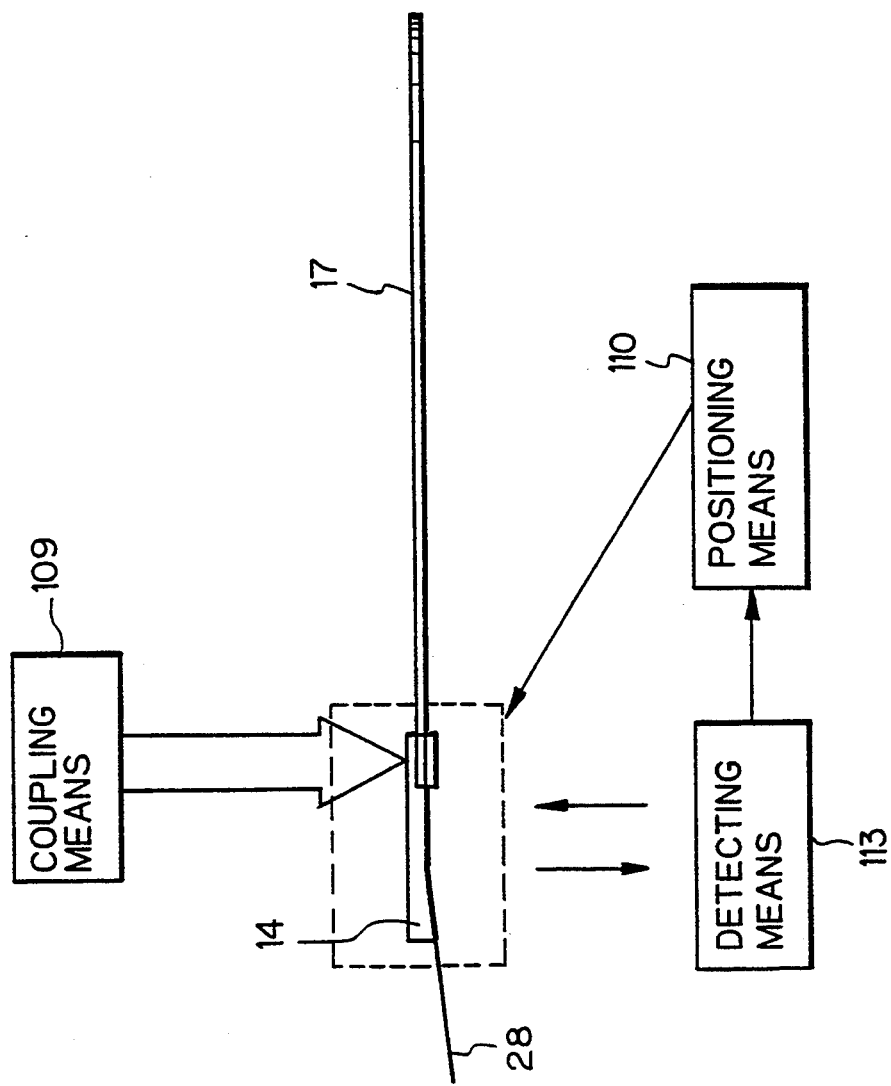
FIGS. 47, 48, 49 and 50 are views showing an eleventh preferred embodiment of a disk drive according to the present invention; and, FIGS. 51, 52, 53, 54, 55, 56 and 57 are views showing a twelfth example of a disk drive according to the present invention.
Figure 48:
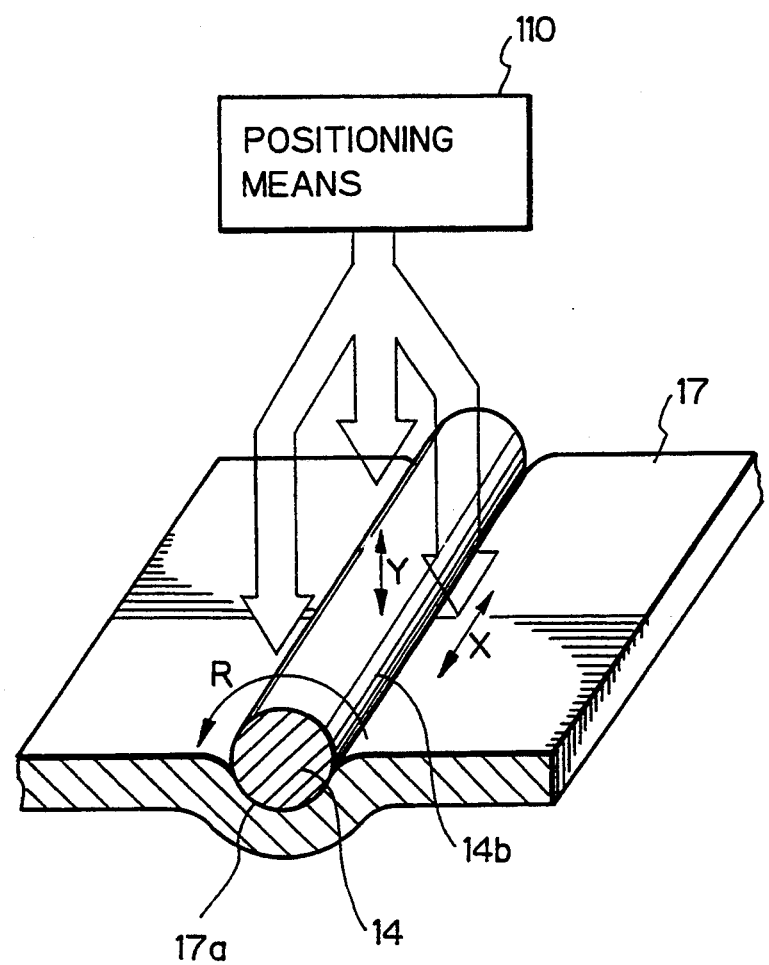
Figure 49:
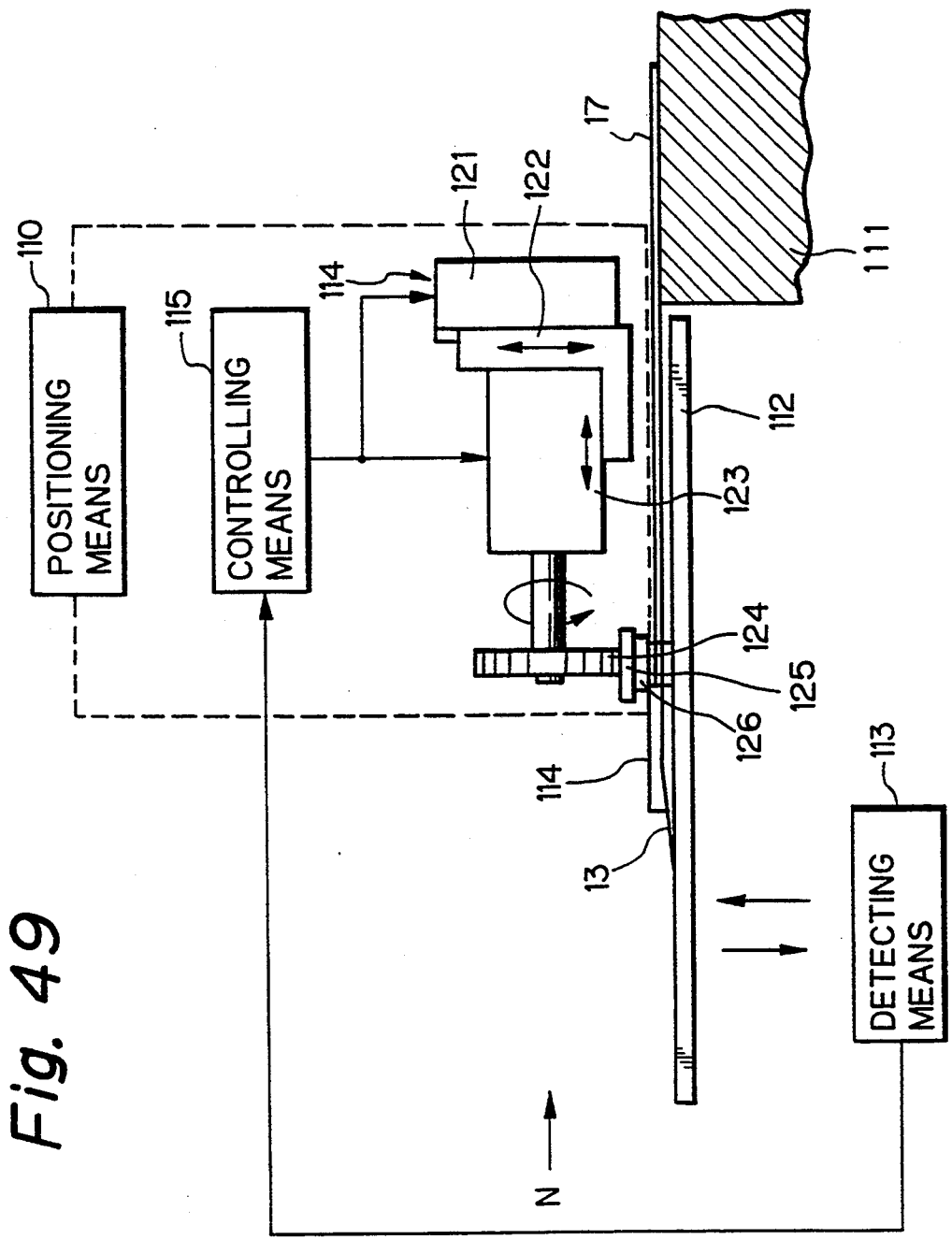
Figure 50:
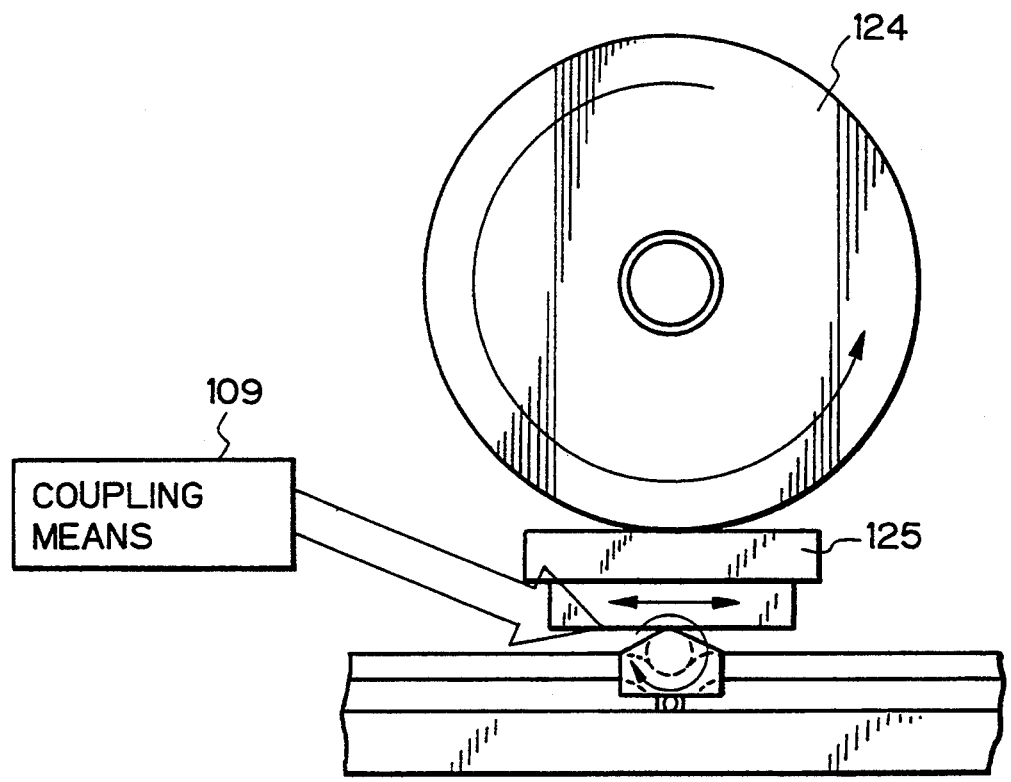

FIGS. 47 to 50 are views showing a eleventh preferred embodiment of a disk drive according to the present invention. To be more specific, FIG. 47 is a block diagram showing the whole construction and FIG. 48 is a block diagram explaining the operations of the positioner means of FIG. 47 and FIG. 49 is a block diagram showing a more concrete example and FIG. 50 is a side view seen from the direction of arrow N in FIG. 49.

The above tenth embodiment illustrates an example of devices for executing the method of assembling the head supporting member in the first to tenth embodiment. In the above device for assembling the head supporting member of the magnetic disk drive, a positioning means 110 operates as follows: the axial direction X, the direction of lamination of disks (V) and the rolling direction of the sliding portion of a head supporting means (R) are all adjusted at the appropriate position with respect to each arm 17; and thereafter, by means of a coupling unit 109, the sliding portion 14b and the guide grooves 17a are fixed to each other.

Further in these figures, 111 denotes a fixing means, i.e., fixing tool that firmly fixes the arms 17. 112 denotes a medium, such as a disk, which is made of glass, etc., and transmits the incident light. In this case, one tip portion of each unitary magnetic head 13, which is mounted on the tapered surface of the arm 17, contacts the above medium 112. 113 denotes a detecting means that detects the position of the tip portion of each unitary magnetic head relative to the medium 112. A positioning means 110 has the following two components: a positioning device (114) that drives the sliding portion 14b of the head supporting members 14 in each of three directions (X, Y, R); and a controlling means 115 that controls the above positioning devices 114.

Furthermore, an example of the positioning device 114 will be described hereinafter with reference to FIGS. 48 and 49. 121 denotes a base. 122 denotes a stage that is movably arranged in a Y direction. On the above stage 122 is mounted a motor 123 that is movably provided in an X direction. A gear 129 is mounted on the outer shaft of the motor 123. Rack members 125 is engaged with the gear 124. When the gear 12 rotates, the rack members 125 are adapted to move parallel with the surface of the media 112. On the lower surface of the rack member 125, the sliding portion 17b of each head supporting member 29 is mounted. In this case, an ultraviolet hardening adhesive is used as a coupling means 109, in which an adhesion between the sliding portion 14b and the guide portion 12a can be performed by irradiating ultraviolet rays and curing the above adhesive.

More specifically, the detecting means 113 operates as follows:

first, the light beam is irradiated in the vicinity of the contact portion between the integrated unitary magnetic head 13 and the medium 112;

second, the reflecting light from the above contact portion is received by light sensors;

third, the degree of angle and relative distance between the unitary magnetic head 13, and the medium 112, etc., are detected; and finally, the results of detection are transmitted to the control means 115.

Further, a sequence of operations of the whole construction will be explained hereinafter.

First, an arm 27 is set to a fixing means 111 and forces a head portion of the unitary magnetic head 13 to have contact with the medium 112.

Second, the detecting means 113 irradiates the light beam in the vicinity of the contact portion between the integrated unitary magnetic head 13 and the medium 112, and then receives the reflecting light.

Third, the detecting means 113 detects the degree of angle and relative distance between the integrated unitary magnetic head 13 and the medium 112 and notifies the control means 115 of the results.

Fourth, the control means 115 drives the positioning devices 115 in accordance with the result of detection and then sets the sliding portion 14b to the guide groove 17a in a predetermined position.

Fifth, when the above setting of position is accomplished, the adhesive of the ultraviolet hardening resin is coated onto the contact portion between the sliding portion 14b and the guide groove 17a.

Finally, after the above adhesive has been applied a coupling means 109 irradiates an ultraviolet ray and the fixing of the contact portion is performed.

According to a device for assembling such a construction, the relative position of the magnetic head to the positioner can be adjusted automatically and further fixed firmly in the desired position. Therefore, an extremely small magnetic head, such as an integrated unitary magnetic head, can be set at a lower cost and with a high degree of accuracy.

Figure 51:
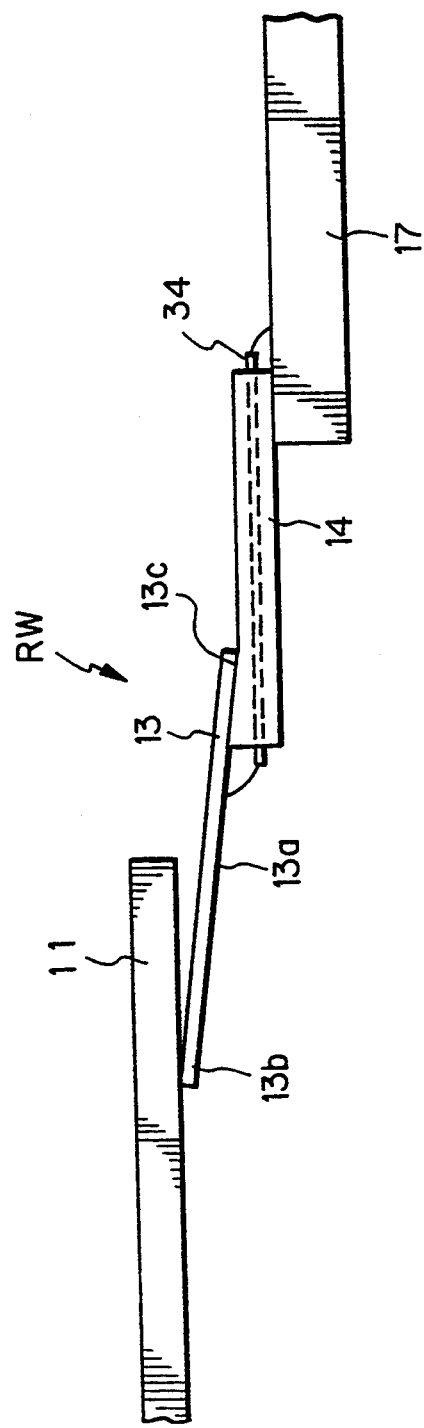
Figure 52:
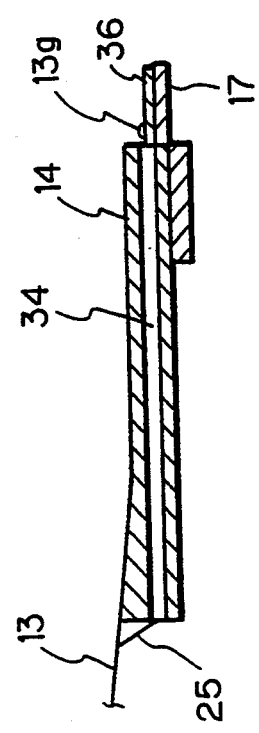
Figure 53:
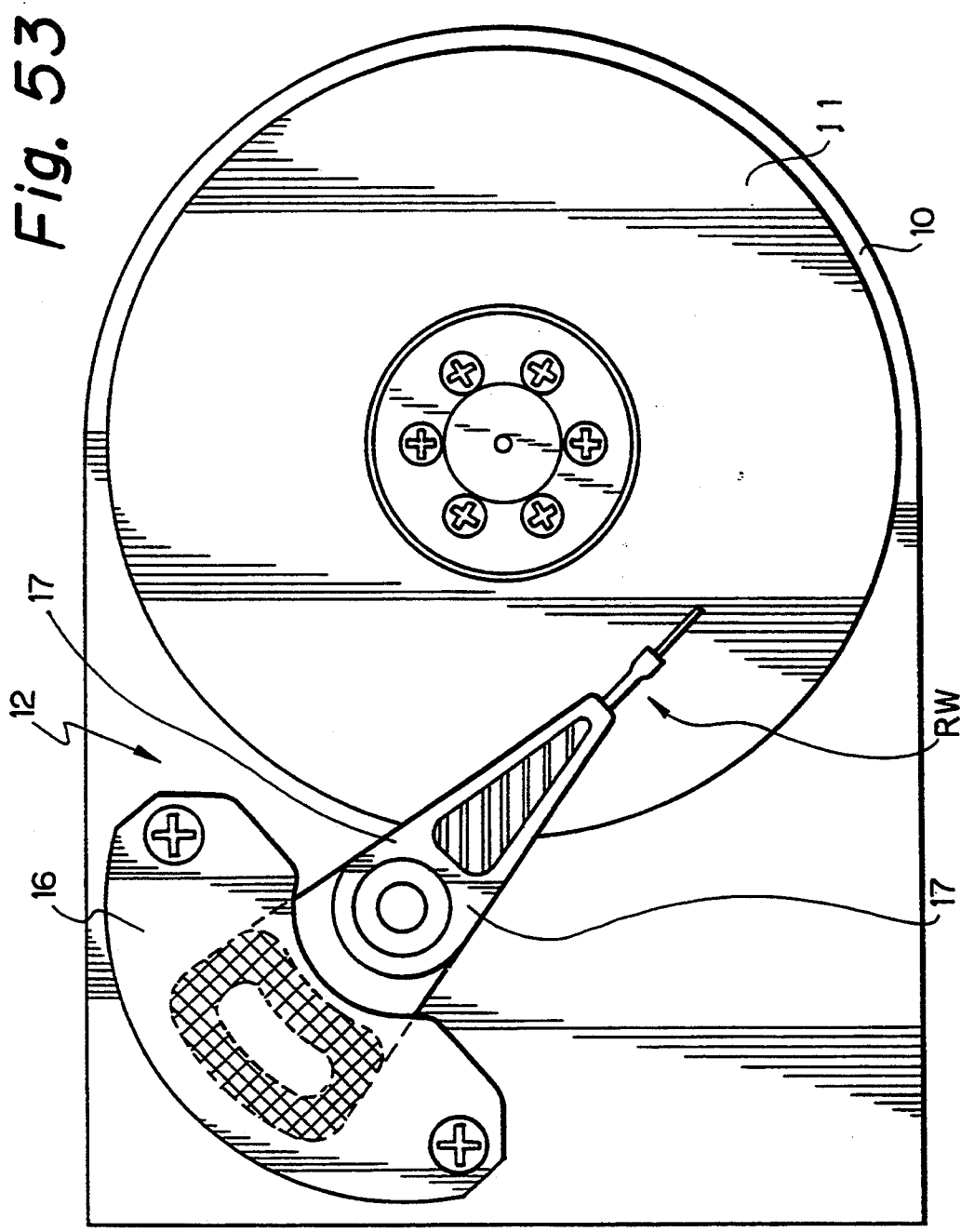
Figure 54:
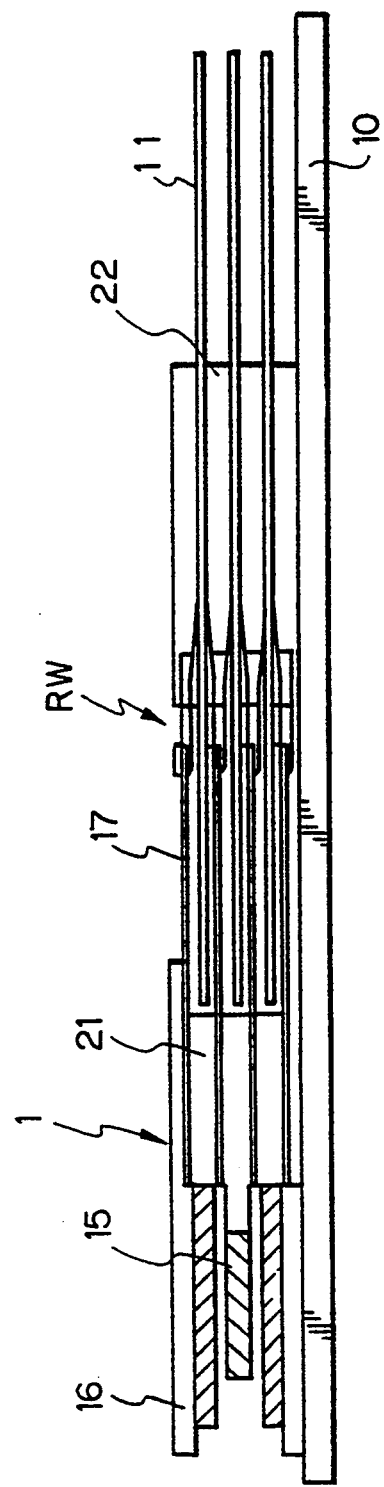
Figure 55:
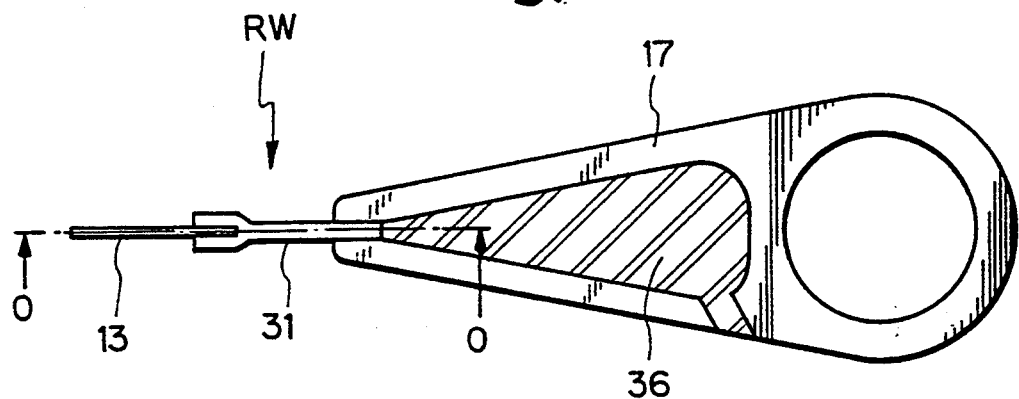
Figure 56:
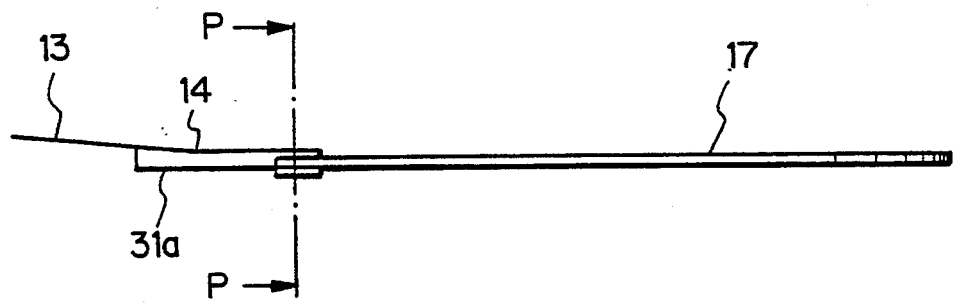
Figure 57:
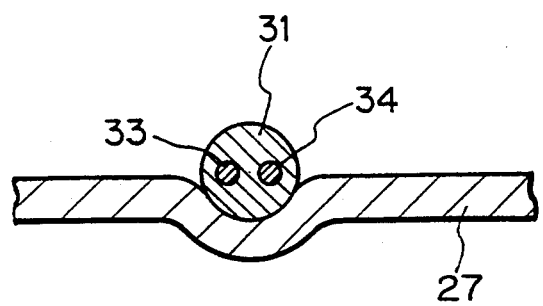

FIG. 51 to 57 are views showing a twelfth preferred embodiment of a disk drive according to the present invention. To be more specific, FIG. 51 is a simplified front view showing the characteristics of the present invention and FIG. 52 is a sectional front view showing the main part of the magnetic disk drive and FIG. 53 is a top view showing the whole structure of the magnetic disk drive and FIG. 54 is a front view of FIG. 53 and FIG. 55 is an enlarged top view showing the arm of positioner in FIG. 53 and FIG. 56 is an enlarged front view of FIG. 55 and FIG. 57 is an enlarged sectional view taken along P—P of FIG. 56. In this case, FIG. 52 may be an enlarged sectional view taken along O—O of FIG. 55.

As shown in these figures, the method for fixing the unitary magnetic head on the positioner of the eleventh embodiment is different from that of the first embodiment. More specifically, in FIGS. 51 to 57, the mounting portion of the unitary magnetic head is fabricated by molding to ensure stable read/write, operations.

To be more specific, each of the head supporting members 31 is made of a resin and has an approximately cylindrical circular form. The tip end portion of the head supporting members 31 is mounted. Further, on the base end portion thereof, a tapered surface 31a is formed. On the above tapered surface 31a, the mounting portion 28 of the integrated magnetic head 13 is fixed by means of adhesion, etc. Further, this head supporting members 31 is fabricated by molding, together with the two metal wires 33, 34. Further, on one end of the two metal wires 33, 34 and on the side of the unitary magnetic head, head lead wires 35 of the unitary magnetic head are connected.

On the arm 17, an FPC 36 is arranged and connected to an FPC 36, via lead wire 37.

In such a construction, metal wires 33, 34 as well as head supporting members 31 are produced by molding, and therefore handling of the magnetic disk drive becomes much easier than that of the prior art. Consequently, the laying of the wires also becomes much easier.

Furthermore, since the lead wires are arranged inside the head supporting member 31, stiffness of the head positioner itself and response characteristics can be improved.

In this case, the present invention is not limited to the above preferred embodiment. In the above eleventh embodiment, the unitary magnetic head 13 and the head supporting member 31 are fixed to each other by means of adhesion. However, the unitary magnetic head 13 and the head supporting member could be integrated by a molding process.

We claim:

1. A magnetic disk drive comprising: one or more disks having a laminated arrangement with equally fixed spaces, wherein the disks are mounted to allow rotation;

disk driving means for causing said disks to rotate;
   one or more positioners each mounted to allow movement across the tracks of a selected disk said positioners having arcuate surfaces formed on an end portion of said positioners;
   positioner driving means for driving said positioners so that their respective ends can traverse said tracks;
   head supporting members attached to said positioners; each of said head supporting members having an arcuate surface at a tip end portion;
   one or more reproducing/recording elements fixed on said respective end portions of said head supporting members at said arcuate surfaces for performing read/write operations on the surfaces of recording media of said disks whereby each of said reproducing/recording elements is rotatably adjustable during assembly of said magnetic disk drive.

2. A magnetic disk drive as set forth in claim 1, wherein each of said reproducing/recording elements is further constructed such that each of the elements is adjustable in a direction perpendicular to the corresponding surface of the recording media of the corresponding disk.

3. A magnetic disk drive as set forth in claim 1, wherein each of said reproducing/recording elements is a unitary magnetic head, consisting of a body made of a flexible thin sheet, a head portion that is located on one tip portion of said body and has an air gap for reproducing or recording on one surface of said body, and a mounting portion that is formed on the opposite tip portion of said body.

4. A magnetic disk drive as set forth in claim 3:

said head supporting members each having a head mounting portion formed at said tip end portion, on which is fixed the opposite tip portion of said body of each of said unitary magnetic heads, and a base end portion where a sliding portion is formed; and
   guide portions each formed on one end of each of said positioners and with which said sliding portion is rotatable and movable in the axial direction during assembly of said magnetic disk drive, and wherein said sliding portion is adapted to be attached to said guide portion.

5. A magnetic disk drive as set forth in claim 1, wherein each of said positioners includes a positioner body portion that constitutes the main part of each of said positioners, and a plurality of arms that are mounted on said positioners in a laminated manner respectively and one tip portion of which extends toward the respectively corresponding surfaces of recording media of said disks.

6. A magnetic disk drive as set forth in claim 4, wherein either one of said sliding portions and said guide portions has a circular cylinder form and the other one thereof has a corresponding arcuate surface that rotatably supports the outer peripheral surface of said circular cylinder.

7. A magnetic disk drive as set forth in claim 6, wherein said circular cylinder is the cylinder having a hollow portion inside; said circular cylinder being adapted to enable lead wires extending from each of said unitary magnetic heads to pass through said hollow portion.

8. A magnetic disk drive as set forth in claim 4, wherein lead wires extending from each of said unitary magnetic heads are constructed so as to be wound around the outer surface of each of said head supporting members.

9. A magnetic disk drive as set forth in claim 4, wherein a flexible printed circuit board, which is mounted on one side of each of said positioners, is constructed so as to be wound around the outer surface of each of said head supporting members and wherein one end of said flexible printed circuit board is connected to lead wires extending from each of said unitary magnetic heads.

10. A magnetic disk drive as set forth in claim 4, wherein each of said head supporting members forms a tapered surface that has a given inclination to the respectively corresponding surface of the recording media of said disks.

11. A magnetic disk drive as set forth in claim 3, wherein it further comprises head supporting members each having a tip end portion that is mounted on one end of each of said positioners and a base end portion in which said mounting portion of each of said unitary magnetic heads is fabricated by molding.

12. A magnetic disk drive as set forth in claim 11, wherein a plurality of lead wires extending from each of said unitary magnetic heads are fabricated by molding simultaneously with said mounting portion of each of said unitary magnetic heads.

13. A magnetic disk drive as set forth in claim 5, wherein at least one arm portion functioning as said arm is integrated with each of said positioners as a portion thereof.

* * * * *

UNITED STATES PATENT AND TRADEMARK OFFICE
CERTIFICATE OF CORRECTION

PATENT NO. : 5,367,420
DATED : November 22, 1994
INVENTOR(S) : Yagi et al.

Page 1 of 2

It is certified that error appears in the above-indentified patent and that said Letters Patent is hereby corrected as shown below:

Abstract, line 20, delete "arras" and insert --arms--.

Column 1, line 56, delete "Surfaces" and insert --surfaces--.

Column 2, line 1, delete "wares" and insert --wires--.

Column 6, line 29, delete "dicks" and insert --disks--.

Column 7, line 10, delete "coal" and insert --coil--.

Column 7, line 38, delete "Canstot" and insert --Censtor--.

Column 10, line 36, delete "PPC" and insert --FPC--.

Column 13, line 3, delete "rotdrably" and insert --rotatably --.

UNITED STATES PATENT AND TRADEMARK OFFICE
CERTIFICATE OF CORRECTION

PATENT NO. : 5,367,420
DATED : November 22, 1994
INVENTOR(S) : Norio Yagi, et al.

It is certified that error appears in the above-indentified patent and that said Letters Patent is hereby corrected as shown below:

Column 16, line 31, before "end" insert --tip--.

Signed and Sealed this

Tenth Day of October, 1995

*Attest:*

BRUCE LEHMAN

*Attesting Officer*  *Commissioner of Patents and Trademarks*